US012647996B2

(12) United States Patent (10) Patent No.: US 12,647,996 B2
Zhou et al. (45) Date of Patent: Jun. 2, 2026

(54) UPDATE OF TRANSMISSION CONFIGURATIONS FOR JOINT DOWNLINK AND UPLINK TRANSMISSION CONFIGURATION INDICATOR (TCI) STATES

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 18/006,353

(22) PCT Filed: Sep. 9, 2020

(86) PCT No.: PCT/CN2020/114174
§ 371 (c)(1),
(2) Date: Jan. 20, 2023

(87) PCT Pub. No.: WO2022/051925
PCT Pub. Date: Mar. 17, 2022

(65) Prior Publication Data
US 2023/0300851 A1 Sep. 21, 2023

(51) Int. Cl.
*H04W 72/231* (2023.01)
*H04L 5/00* (2006.01)
(52) U.S. Cl.
CPC ......... *H04W 72/231* (2023.01); *H04L 5/0094* (2013.01)
(58) Field of Classification Search
CPC ........................... H04L 5/0094; H04W 72/231
(Continued)

(56) References Cited

U.S. PATENT DOCUMENTS

| 10,512,075 B2 | 12/2019 | John Wilson et al. |
| 11,637,666 B2 * | 4/2023 | Grant .................... H04L 5/0044 |
| | | 370/329 |

(Continued)

FOREIGN PATENT DOCUMENTS

| CN | 111586862 A | 8/2020 |
| WO | 2018144168 | 8/2018 |

(Continued)

OTHER PUBLICATIONS

ZTE: "Preliminary Views on Further Enhancement for NR MIMO", 3GPP TSG RAN WG1 Meeting #101-e, R1-2003483, 3rd Generation Partnership Project, Mobile Competence Centre, 650, Route Des Lucioles, F-06921 Sophia-Antipolis Cedex, France, vol. RAN WG1, e-Meeting, May 25, 2020-Jun. 5, 2020, 19 Pages, May 16, 2020, XP051885267.

(Continued)

*Primary Examiner* — Peter G Solinsky
(74) *Attorney, Agent, or Firm* — Harrity & Harrity, LLP

(57) ABSTRACT

This disclosure provides systems, methods, and apparatuses for updating a joint downlink and uplink transmission configuration indicator (TCI) state for a communication channel or a reference signal. In one aspect, abase station (BS) may indicate, to a user equipment (UE), a joint downlink and uplink TCI state for a communication channel or a reference signal. The BS may indicate a usage, transmission types, or transmission resources associated with the joint downlink and uplink TCI state. Accordingly, the UE may associate the joint downlink and uplink TCI state with a channel or reference signal, as indicated by the BS. This enables to the UE to utilize a common beam indicated by the joint downlink and uplink TCI state. As a result, the UE and the BS may reduce signaling and network overhead by using a single (Continued)

800 ➤

810 〜 Determine a joint downlink and uplink TCI state associated with at least one of a communication channel or a reference signal for a user equipment (UE)

820 〜 Transmit, to the UE, an indication of the joint downlink and uplink TCI state TCI to indicate properties of a common beam for both downlink and uplink.

30 Claims, 10 Drawing Sheets

(58) Field of Classification Search
USPC ........................................................ 370/329
See application file for complete search history.

(56) References Cited

U.S. PATENT DOCUMENTS

| | | | |
|---|---|---|---|
| 2019/0115955 A1 | 4/2019 | John Wilson et al. | |
| 2019/0349059 A1* | 11/2019 | John Wilson | H04B 7/0695 |
| 2020/0137741 A1* | 4/2020 | Zhou | H04L 5/0025 |
| 2020/0245333 A1* | 7/2020 | Lin | H04L 1/0026 |
| 2020/0344729 A1* | 10/2020 | Park | H04L 5/0053 |
| 2022/0061031 A1* | 2/2022 | Park | H04L 5/0094 |
| 2022/0061056 A1* | 2/2022 | Farag | H04B 7/0639 |
| 2022/0232544 A1* | 7/2022 | Bai | H04B 7/0695 |
| 2023/0144010 A1* | 5/2023 | Kwak | H04L 5/0051 |
| | | | 370/329 |
| 2023/0284205 A1* | 9/2023 | Nory | H04W 72/232 |
| | | | 370/329 |

FOREIGN PATENT DOCUMENTS

| | | |
|---|---|---|
| WO | 2020036433 A1 | 2/2020 |
| WO | 2020102022 | 5/2020 |

OTHER PUBLICATIONS

Supplementary European Search Report—EP20952713—Search Authority—The Hague—Apr. 29, 2024.

International Search Report and Written Opinion—PCT/CN2020/114174—ISA/EPO—Jun. 8, 2021.

Samsung: "Multi-Beam Enhancements", 3GPP TSG RAN WG1 #102-e, R1-2006991, e-Meeting, Aug. 17-28, 2020 (Aug. 28, 2020), 15 Pages, Aug. 25, 2020 (Aug. 25, 2020), Section 3, 3.1, 3.2, part 3, the whole document.

ZTE: "Preliminary Views on Further Enhancement for NR MIMO", 3GPP TSG RAN WG1 Meeting #101-e, R1-2003483, e-Meeting, May 25-Jun. 5, 2020, 19 Pages, Jun. 5, 2020 (Jun. 5, 2020), section 2.2.2, the whole document.

* cited by examiner

710 — Receive, from a base station (BS), an indication of a joint downlink and uplink transmission configuration indicator (TCI) state associated with at least one of a communication channel or a reference signal 720 — Communicate, with the BS, using at least one of the communication channel or the reference signal, in accordance with the joint downlink and uplink TCI state

700

Determine a joint downlink and uplink TCI state associated with at least one of a communication channel or a reference signal for a user equipment (UE)

Transmit, to the UE, an indication of the joint downlink and uplink TCI state

810

820

800

UPDATE OF TRANSMISSION CONFIGURATIONS FOR JOINT DOWNLINK AND UPLINK TRANSMISSION CONFIGURATION INDICATOR (TCI) STATES

CROSS-REFERENCE TO RELATED APPLICATION

This application is a 371 national stage of Patent Cooperation Treaty (PCT) Application No. PCT/CN2020/114174 filed on Sep. 9, 2020, entitled "UPDATE OF TRANSMISSION CONFIGURATIONS FOR JOINT DOWNLINK AND UPLINK TRANSMISSION CONFIGURATION INDICATOR (TCI) STATES," which is hereby expressly incorporated by reference herein.

TECHNICAL FIELD

Aspects of the present disclosure relate generally to wireless communication and to techniques for an update of transmission configurations for joint downlink and uplink transmission configuration indicator (TCI) states.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving, from a base station (BS), an indication of a joint downlink and uplink transmission configuration indicator (TCI) state associated with at least one of a communication channel or a reference signal; and communicating, with the BS, using at least one of the communication channel or the reference signal, in accordance with the joint downlink and uplink TCI state.

In some implementations, receiving the indication of the joint downlink and uplink TCI state occurs via a radio resource control (RRC) message. In some implementations, receiving the indication of the joint downlink and uplink TCI state occurs via a medium access control (MAC) control element (MAC-CE) message.

In some implementations, the method can include transmitting, to the BS, an acknowledgement feedback message associated with the MAC-CE message; and associating the joint downlink and uplink TCI state with at least one of the communication channel or the reference signal after an amount of time, indicated by an action time associated with the MAC-CE message, after transmitting the acknowledgement feedback message.

In some implementations, the method can include receiving, from the BS, an RRC configuration indicating a set of candidate joint downlink and uplink TCI states; and where the MAC-CE message indicates a candidate joint downlink and uplink TCI state from the set of candidate joint downlink and uplink TCI states indicated by the RRC configuration.

In some implementations, receiving the indication of the joint downlink and uplink TCI state occurs via a downlink control information (DCI) message. In some implementations, the method can include associating the joint downlink and uplink TCI state with at least one of the communication channel or the reference signal after an amount of time, indicated by an action time associated with the DCI message, after receiving the DCI message. In some implementations, the method can include transmitting, to the BS, an acknowledgement feedback message associated with the DCI message; and associating the joint downlink and uplink TCI state with at least one of the communication channel or the reference signal after an amount of time, indicated by an action time associated with the DCI message, after transmitting the acknowledgement feedback message.

In some implementations, the method can include receiving, from the BS, a MAC-CE message activating a subset of candidate joint downlink and uplink TCI states from a set of candidate joint downlink and uplink TCI states indicated by an RRC configuration; and where the DCI message indicates a candidate joint downlink and uplink TCI state from the subset of candidate joint downlink and uplink TCI states indicated by MAC-CE message.

In some implementations, the communication channel includes at least one of: a physical downlink control channel (PDCCH), a physical downlink shared channel (PDSCH), a physical uplink control channel (PUCCH), a physical uplink shared channel (PUSCH), or a physical random access channel (PRACH). In some implementations, the PDSCH includes at least one of: a PDSCH scheduled by DCI, or a PDSCH scheduled by semi-persistent scheduling (SPS). In some implementations, the communication channel includes at least one of: a periodic communication channel, a semi-persistent communication channel, or an aperiodic communication channel.

In some implementations, the reference signal includes at least one of: a periodic channel state information reference signal (CSI-RS), a semi-persistent CSI-RS, an aperiodic CSI-RS, a periodic positioning reference signal (PRS), a semi-persistent PRS, an aperiodic PRS, a periodic sounding reference signal (SRS), a semi-persistent SRS, or an aperiodic SRS.

In some implementations, the method can include receiving, from the BS, an indication of a communication direction associated with the joint downlink and uplink TCI state. In some implementations, the indication of the communication direction associated with the joint downlink and uplink TCI state indicates that the joint downlink and uplink TCI state is associated with communications in: a downlink communication direction only, an uplink communication direction only, or a downlink communication direction and an uplink communication direction. In some implementations, the indication of the communication direction is included in an RRC configured field. In some implementations, the RRC configured field is a field included in the indication of the joint downlink and uplink TCI state. In some implementations, the RRC configured field is an information element field that is separate from the indication of the joint downlink and uplink TCI state.

In some implementations, receiving the indication of the communication direction associated with the joint downlink and uplink TCI state occurs via a MAC-CE message. In some implementations, the MAC-CE message activates one or more joint downlink and uplink TCI states, including the joint downlink and uplink TCI state, and the MAC-CE message includes a field for each joint downlink and uplink TCI state to indicate a communication direction. In some implementations, receiving the indication of the communication direction associated with the joint downlink and uplink TCI state includes receiving a first MAC-CE message that activates the joint downlink and uplink TCI state; and receiving a second MAC-CE message that includes the indication of the communication direction associated with the joint downlink and uplink TCI state.

In some implementations, receiving the indication of the communication direction associated with the joint downlink and uplink TCI state occurs via a DCI message. In some implementations, the DCI message indicates that one or more joint downlink and uplink TCI states, including the joint downlink and uplink TCI state, are selected from a set of activated joint downlink and uplink TCI states, and the DCI message includes a field for each joint downlink and uplink TCI state to indicate a communication direction. In some implementations, receiving the indication of the communication direction associated with the joint downlink and uplink TCI state includes receiving a first DCI message selecting the joint downlink and uplink TCI state from a set of activated joint downlink and uplink TCI states; and receiving a second DCI message indicating the communication direction associated with the joint downlink and uplink TCI state.

In some implementations, the method can include receiving, from the BS, an indication of at least one of: one or more transmission types associated with the joint downlink and uplink TCI state, or one or more transmission resources associated with the joint downlink and uplink TCI state.

In some implementations, the method can include receiving an indication that the joint downlink and uplink TCI state is associated with a downlink communication direction only, or with a downlink communication direction and an uplink communication direction.

In some implementations, the one or more transmission types associated with the joint downlink and uplink TCI state include at least one of: all PDSCH transmission types dedicated to the UE, or a subset of PDSCH transmission types of all PDSCH transmission types dedicated to the UE. In some implementations, a PDSCH transmission type includes at least one of: an SPS PDSCH transmission, a PDSCH transmission scheduled by DCI with a scheduling offset less than a beam switch latency threshold, or a PDSCH transmission scheduled by DCI with a scheduling offset greater than or equal to the beam switch latency threshold.

In some implementations, the one or more transmission resources associated with the joint downlink and uplink TCI state include at least one of: all control resource sets (CORESETs) associated with the UE, a subset of CORESETs, of all CORESETs associated with the UE, all search spaces associated with the UE, a subset of search spaces, of all search spaces associated with the UE, all CSI-RS resources associated with the UE, or a subset of CSI-RS resources of all CSI-RS resources associated with the UE. In some implementations, the subset of CORESETs, of all CORESETs associated with the UE, are indicated by indexes associated with the subset of CORESETs. In some implementations, the subset of search spaces, of all search spaces associated with the UE, are indicated by indexes or types associated with the subset of search spaces. In some implementations, a type of search space includes a UE specific search space (USS) or a common search space (CSS). In some implementations, the subset of CSI-RS resources, of all CSI-RS resources associated with the UE, are indicated by resource identifiers or types associated with the subset of CSI-RS resources. In some implementations, a type of CSI-RS resource includes at least one of: a periodic CSI-RS resource, a semi-persistent CSI-RS resource, an aperiodic CSI-RS resource, a beam management CSI-RS resource, a tracking reference signal (TRS) CSI-RS resource, or a channel state feedback CSI-RS resource.

In some implementations, the method can include receiving an indication that the joint downlink and uplink TCI state is associated with an uplink communication direction only, or with a downlink communication direction and an uplink communication direction.

In some implementations, the one or more transmission types associated with the joint downlink and uplink TCI state include at least one of: all PUSCH transmission types dedicated to the UE, a subset of PUSCH transmission types of all PUSCH transmission types dedicated to the UE, all PUCCH transmission types dedicated to the UE, or a subset of PUCCH transmission types of all PUCCH transmission types dedicated to the UE. In some implementations, a PUSCH transmission type includes at least one of: a configured grant (CG) PUSCH transmission, a PUSCH transmission scheduled by DCI, a codebook based PUSCH transmission, or a non-codebook based PUSCH transmission. In some implementations, a PUCCH transmission type includes at least one of: a periodic PUCCH transmission, a semi-persistent PUCCH transmission, or an aperiodic PUCCH transmission.

In some implementations, the one or more transmission resources associated with the joint downlink and uplink TCI state include at least one of: all SRS resources associated with the UE, a subset of SRS resources, of all SRS resources associated with the UE, all PRACH resources associated with the UE, or a subset of PRACH resources, of all PRACH resources associated with the UE. In some implementations, the subset of SRS resources, of all SRS resources associated with the UE, are indicated by resource identifiers or types associated with the subset of SRS resources. In some implementations, a type of SRS resource includes at least one of: a periodic SRS resource, a semi-persistent SRS resource, an aperiodic SRS resource, a codebook based SRS resource, a non-codebook based SRS resource, an SRS resource for antenna switching, or an SRS resource for beam management. In some implementations, the subset of PRACH resources, of all PRACH resources associated with the UE, are indicated by resource identifiers or types associated with the subset of PRACH resources. In some implementations, a type of PRACH resource includes at least one of: a contention free random access PRACH resource, a contention based random access PRACH resource, or a PRACH resource that is not associated with a beam failure recovery purpose.

Another innovative aspect of the subject matter described in this disclosure can be implemented in an apparatus of a UE for wireless communication. The apparatus may include a first interface configured to obtain, from a BS, an indication of a joint downlink and uplink TCI state associated with at least one of a communication channel or a reference signal. The apparatus may include one or more interfaces configured to communicate, with the BS, using at least one of the communication channel or the reference signal, in accordance with the joint downlink and uplink TCI state. For example, the first interface can configured to obtain communications, from the BS, using at least one of the communication channel or the reference signal, in accordance with the joint downlink and uplink TCI state. The apparatus may include a second interface configured to output communications, to the BS, using at least one of the communication channel or the reference signal, in accordance with the joint downlink and uplink TCI state. In some aspects, the apparatus of the UE may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the UE to: receive, from a BS, an indication of a joint downlink and uplink TCI state associated with at least one of a communication channel or a reference signal; and communicate, with the BS, using at least one of the communication channel or the reference signal, in accordance with the joint downlink and uplink TCI state. In some aspects, the non-transitory computer-readable medium may implement any one or more of the aspects described in connection with the method, above or elsewhere herein.

Another innovative aspect of the subject matter described in this disclosure can be implemented in an apparatus for wireless communication. The apparatus may include means for receiving, from a BS, an indication of a joint downlink and uplink TCI state associated with at least one of a communication channel or a reference signal; and means for communicating, with the BS, using at least one of the communication channel or the reference signal, in accordance with the joint downlink and uplink TCI state. In some aspects, the apparatus may perform or implement any one or more of the aspects described in connection with the method, above or elsewhere herein.

Another innovative aspect of the subject matter described in this disclosure can be implemented in a method of wireless communication performed by an apparatus of a BS. The method may include determining a joint downlink and uplink TCI state associated with at least one of a communication channel or a reference signal for a UE; and transmitting, to the UE, an indication of the joint downlink and uplink TCI state.

In some implementations, the method can include communicating, with the UE, using at least one of the communication channel or the reference signal, in accordance with the joint downlink and uplink TCI state.

In some implementations, transmitting the indication of the joint downlink and uplink TCI state occurs via an RRC message. In some implementations, transmitting the indication of the joint downlink and uplink TCI state occurs via a MAC-CE message.

In some implementations, the method can include receiving, from the UE, an acknowledgement feedback message associated with the MAC-CE message, associating the joint downlink and uplink TCI state with at least one of the communication channel or the reference signal after an amount of time, indicated by an action time associated with the MAC-CE message, after receiving the acknowledgement feedback message. In some implementations, the method can include transmitting, to the UE, an RRC configuration indicating a set of candidate joint downlink and uplink TCI states; and where the MAC-CE message indicates a candidate joint downlink and uplink TCI state from the set of candidate joint downlink and uplink TCI states indicated by the RRC configuration.

In some implementations, transmitting the indication of the joint downlink and uplink TCI state occurs via a DCI message. In some implementations, the method can include associating the joint downlink and uplink TCI state with at least one of the communication channel or the reference signal after an amount of time, indicated by an action time associated with the DCI message, after transmitting the DCI message. In some implementations, the method can include receiving, from the UE, an acknowledgement feedback message associated with the DCI message; and associating the joint downlink and uplink TCI state with at least one of the communication channel or the reference signal after an amount of time, indicated by an action time associated with the DCI message, after receiving the acknowledgement feedback message.

In some implementations, the method can include transmitting, to the UE, a MAC-CE message activating a subset of candidate joint downlink and uplink TCI states from a set of candidate joint downlink and uplink TCI states indicated by an RRC configuration; and where the DCI message indicates a candidate joint downlink and uplink TCI state from the subset of candidate joint downlink and uplink TCI states indicated by MAC-CE message.

In some implementations, the communication channel includes at least one of: a PDCCH, a PDSCH, a PUCCH, a PUSCH, or a PRACH. In some implementations, the PDSCH includes at least one of: a PDSCH scheduled by DCI, or a PDSCH scheduled by SPS. In some implementations, the communication channel includes at least one of: a periodic communication channel, a semi-persistent communication channel, or an aperiodic communication channel.

In some implementations, the reference signal includes at least one of: a periodic CSI-RS, a semi-persistent CSI-RS, an aperiodic CSI-RS, a periodic PRS, a semi-persistent PRS, an aperiodic PRS, a periodic SRS, a semi-persistent SRS, or an aperiodic SRS.

In some implementations, the method can include transmitting, to the UE, an indication of a communication direction associated with the joint downlink and uplink TCI state. In some implementations, the indication of the communication direction associated with the joint downlink and uplink TCI state indicates that the joint downlink and uplink TCI state is associated with communications in: a downlink communication direction only, an uplink communication direction only, or a downlink communication direction and an uplink communication direction.

In some implementations, the indication of the communication direction is included in an RRC configured field. In some implementations, the RRC configured field is a field included in the indication of the joint downlink and uplink TCI state. In some implementations, the RRC configured field is an information element field that is separate from the indication of the joint downlink and uplink TCI state.

In some implementations, transmitting the indication of the communication direction associated with the joint downlink and uplink TCI state occurs via a MAC-CE message. In some implementations, the MAC-CE message activates one or more joint downlink and uplink TCI states, including the joint downlink and uplink TCI state, and the MAC-CE message includes a field for each joint downlink and uplink TCI state to indicate a communication direction. In some implementations, transmitting the indication of the communication direction associated with the joint downlink and uplink TCI state includes transmitting a first MAC-CE message that activates the joint downlink and uplink TCI state; and transmitting a second MAC-CE message that includes the indication of the communication direction associated with the joint downlink and uplink TCI state.

In some implementations, transmitting the indication of the communication direction associated with the joint downlink and uplink TCI state occurs via a DCI message. In some implementations, the DCI message indicates that one or more joint downlink and uplink TCI states, including the joint downlink and uplink TCI state, are selected from a set of activated joint downlink and uplink TCI states, and the DCI message includes a field for each joint downlink and uplink TCI state to indicate a communication direction. In some implementations, transmitting the indication of the communication direction associated with the joint downlink and uplink TCI state includes transmitting a first DCI message selecting the joint downlink and uplink TCI state from a set of activated joint downlink and uplink TCI states; and transmitting a second DCI message indicating the communication direction associated with the joint downlink and uplink TCI state.

In some implementations, the method can include transmitting, to the UE, an indication of at least one of one or more transmission types associated with the joint downlink and uplink TCI state, or one or more transmission resources associated with the joint downlink and uplink TCI state.

In some implementations, the method can include transmitting an indication that the joint downlink and uplink TCI state is associated with a downlink communication direction only, or with a downlink communication direction and an uplink communication direction.

In some implementations, the one or more transmission types associated with the joint downlink and uplink TCI state include at least one of: all PDSCH transmission types dedicated to the UE, or a subset of PDSCH transmission types of all PDSCH transmission types dedicated to the UE. In some implementations, a PDSCH transmission type includes at least one of: an SPS PDSCH transmission, a PDSCH transmission scheduled by DCI with a scheduling offset less than a beam switch latency threshold, or a PDSCH transmission scheduled by DCI with a scheduling offset greater than or equal to the beam switch latency threshold.

In some implementations, the one or more transmission resources associated with the joint downlink and uplink TCI state include at least one of: all CORESETs associated with the UE, a subset of CORESETs of all CORESETs associated with the UE, all search spaces associated with the UE, a subset of search spaces of all search spaces associated with the UE, all CSI-RS resources associated with the UE, or a subset of CSI-RS resources of all CSI-RS resources associated with the UE. In some implementations, the subset of CORESETs, of all CORESETs associated with the UE, are indicated by indexes associated with the subset of CORESETs. In some implementations, the subset of search spaces, of all search spaces associated with the UE, are indicated by indexes or types associated with the subset of search spaces. In some implementations, a type of search space includes a USS or a CSS. In some implementations, the subset of CSI-RS resources, of all CSI-RS resources associated with the UE, are indicated by resource identifiers or types associated with the subset of CSI-RS resources. In some implementations, a type of CSI-RS resource includes at least one of a periodic CSI-RS resource, a semi-persistent CSI-RS resource, an aperiodic CSI-RS resource, a beam management CSI-RS resource, a tracking reference signal CSI-RS resource, or a channel state feedback CSI-RS resource.

In some implementations, the method can include transmitting an indication that the joint downlink and uplink TCI state is associated with an uplink communication direction only, or with a downlink communication direction and an uplink communication direction.

In some implementations, the one or more transmission types associated with the joint downlink and uplink TCI state include at least one of: all PUSCH transmission types dedicated to the UE, a subset of PUSCH transmission types of all PUSCH transmission types dedicated to the UE, all PUCCH transmission types dedicated to the UE, or a subset of PUCCH transmission types of all PUCCH transmission types dedicated to the UE. In some implementations, a PUSCH transmission type includes at least one of: a CG PUSCH transmission, a PUSCH transmission scheduled by DCI, a codebook based PUSCH transmission, or a non-codebook based PUSCH transmission. In some implementations, a PUCCH transmission type includes at least one of: a periodic PUCCH transmission, a semi-persistent PUCCH transmission, or an aperiodic PUCCH transmission.

In some implementations, the one or more transmission resources associated with the joint downlink and uplink TCI state include at least one of: all SRS resources associated with the UE, a subset of SRS resources of all SRS resources associated with the UE, all PRACH resources associated with the UE, or a subset of PRACH resources of all PRACH resources associated with the UE. In some implementations, the subset of SRS resources, of all SRS resources associated with the UE, are indicated by resource identifiers or types associated with the subset of SRS resources. In some implementations, a type of SRS resource includes at least one of: a periodic SRS resource, a semi-persistent SRS resource, an aperiodic SRS resource, a codebook based SRS resource, a non-codebook based SRS resource, an SRS resource for antenna switching, or an SRS resource for beam management. In some implementations, the subset of PRACH resources, of all PRACH resources associated with the UE, are indicated by resource identifiers or types associated with the subset of PRACH resources. In some implementations, a type of PRACH resource includes at least one of: a contention free random access PRACH resource, a contention based random access PRACH resource, or a PRACH resource that is not associated with a beam failure recovery purpose.

Another innovative aspect of the subject matter described in this disclosure can be implemented in an apparatus of a BS for wireless communication. The apparatus may include a processing system configured to determine a joint downlink and uplink TCI state associated with at least one of a communication channel or a reference signal for a UE. The apparatus may include a first interface configured to obtain communications, from the UE, using at least one of the communication channel or the reference signal, in accordance with the joint downlink and uplink TCI state. The apparatus may include a second interface configured to output an indication, to the UE, of the joint downlink and uplink TCI state; or communications, to the UE, using at least one of the communication channel or the reference signal, in accordance with the joint downlink and uplink TCI state. In some aspects, the apparatus of the BS may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the BS to: determine a joint downlink and uplink TCI state associated with at least one of a communication channel or a reference signal for a UE; and transmit, to the UE, an indication of the joint downlink and uplink TCI state. In some aspects, the non-transitory computer-readable medium may implement any one or more of the aspects described in connection with the method, above or elsewhere herein.

Another innovative aspect of the subject matter described in this disclosure can be implemented in an apparatus for wireless communication. The apparatus may include means for determining a joint downlink and uplink TCI state associated with at least one of a communication channel or a reference signal for a UE; and means for transmitting, to the UE, an indication of the joint downlink and uplink TCI state. In some aspects, the apparatus may perform or implement any one or more of the aspects described in connection with the method, above or elsewhere herein.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
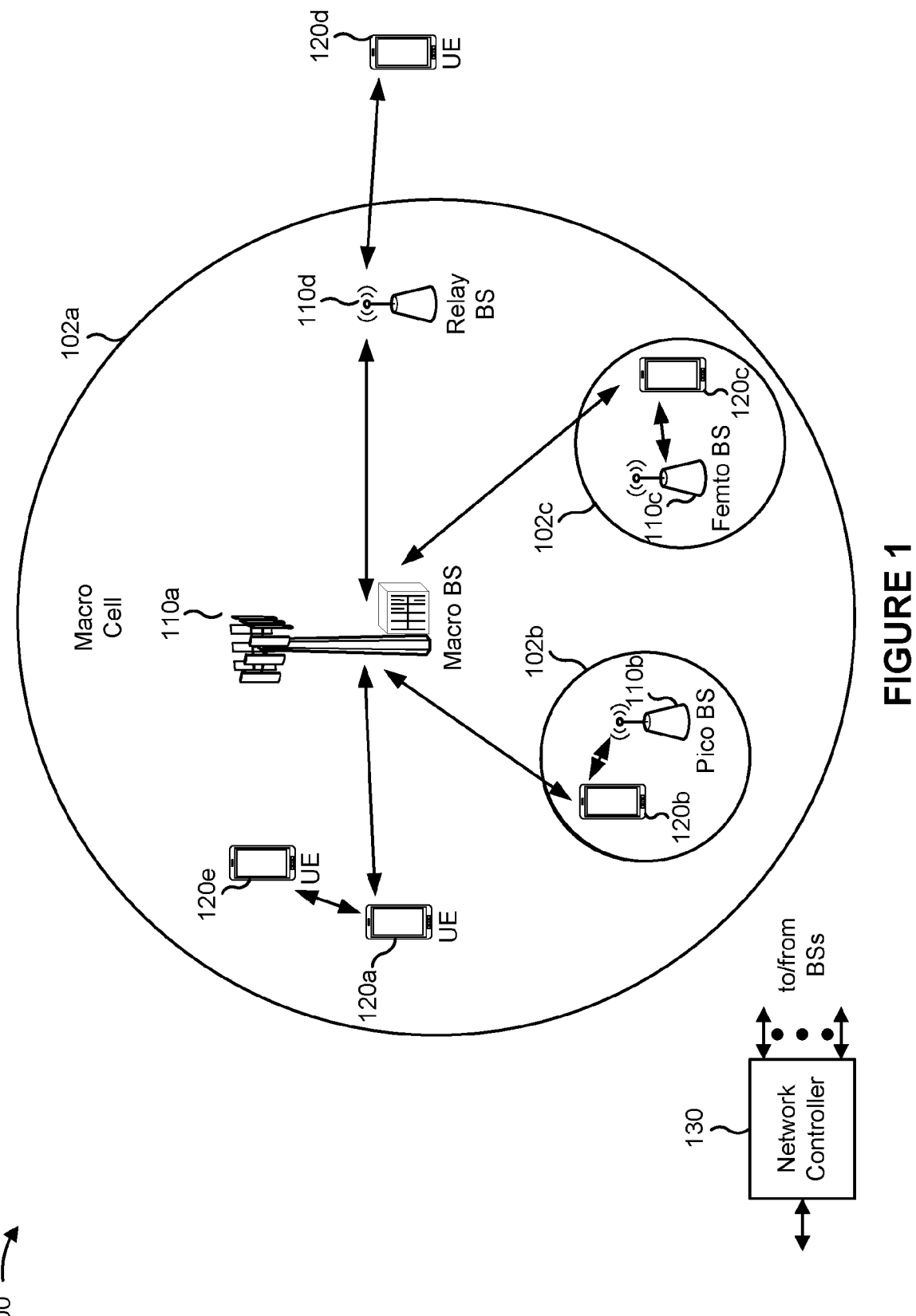
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some situations, a user equipment (UE) may decode a downlink transmission, from a base station (BS), using a transmission configuration indicator (TCI), such as a TCI state, as defined in the 3GPP specifications, or another similar data structure. The TCI state may indicate one or more quasi-co-location (QCL) rules, where a rule associates a reference signal (such as a synchronization signal; a synchronization signal block (SSB); a channel state indicator reference signal (CSI-RS); or other reference signal) with associated channel properties (such as a Doppler shift; a Doppler spread; an average delay; a delay spread; one or more spatial parameters, such as a spatial filter; or other properties). Such QCL rules may include QCL-TypeA, QCL-TypeB, QCL-TypeC, or QCL-TypeD data structures as defined by 3GPP specifications.

In some cases, a BS may transmit a TCI state that indicates one or more reference signals providing a UE with properties for a common beam. A beam may be "common" when the beam is used by the UE to transmit data or control information on the uplink as well as used by the UE to receive data or control information on the downlink. A TCI state that indicates properties for a common beam may be referred to as a joint downlink and uplink TCI state.

However, as a joint downlink and uplink TCI state may be associated with or otherwise applied to uplink channels, uplink reference signals, downlink channels, or downlink reference signals, it may be unclear how to signal an update of a joint downlink and uplink TCI state for various communication channels or reference signals. Various aspects of the subject matter described in this disclosure relate generally to enabling a BS to indicate a joint downlink and uplink TCI state for one or more communication channels or one or more reference signals. For example, the BS may indicate a communication channel associated with the joint downlink and uplink TCI state, a reference signal associated with the joint downlink and uplink TCI state, a usage associated with the joint downlink and uplink TCI state, one or more transmission types (for example, downlink transmission types or uplink transmission types) associated with the joint downlink and uplink TCI state, or one or more transmission resources (for example, downlink transmission resources or uplink transmission resources) associated with the joint downlink and uplink TCI state, among other examples.

Particular implementations of the subject matter described in this disclosure can be implemented to realize one or more of the following potential advantages. The BS may indicate a joint downlink and uplink TCI state for a communication channel or a reference signal. The BS may indicate a usage associated with the joint downlink and uplink TCI state. Additionally, the BS may indicate transmission types or transmission resources associated with the joint downlink and uplink TCI state. Accordingly, the UE may associate or otherwise apply the joint downlink and uplink TCI state to a channel or reference signal as indicated by the BS. This may enable the UE to utilize a common beam indicated by the joint downlink and uplink TCI state. As a result, the UE and the BS may reduce signaling and network overhead by using a single TCI to indicate properties of a common beam for both downlink and uplink. The joint downlink and uplink TCI state may enable a unified TCI framework for a simplified beam management procedure for downlink channels, uplink channels, data channels, or control channels in 3GPP New Radio (NR) systems.

FIG. 1 is a diagram illustrating an example of a wireless network 100. The wireless network 100 may be or may include elements of a 5G (NR) network, an LTE network, or another type of network. The wireless network 100 may include one or more base stations 110 (shown as BS 110a, BS 110b, BS 110c, and BS 110d) and other network entities.

A base station (BS) is an entity that communicates with user equipment (UEs) and also may be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

The wireless network 100 may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay BS 110d may communicate with a macro BS 110a and a UE 120d in order to facilitate communication between the macro BS 110a and the UE 120d. A relay BS also may be referred to as a relay station, a relay base station, a relay, etc.

The wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

Multiple UEs 120 (for example, a UE 120a, a UE 120b, a UE 120c, etc.) may be dispersed throughout the wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, or other components. In some examples, the processor components and the memory components may be coupled together. For example, the processor components (for example, one or more processors) and the memory components (for example, a memory) may be operatively coupled, communicatively coupled, electronically coupled, or electrically coupled, among other examples.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some aspects, two or more UEs 120 (for example, shown as a UE 120a and a UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In such examples, the UE 120 may perform scheduling operations, resource selection operations, as well as other operations described elsewhere herein as being performed by the base station 110.

Devices of the wireless network 100 may communicate using the electromagnetic spectrum, which may be subdivided based on frequency or wavelength into various classes, bands, or channels. For example, devices of the wireless network 100 may communicate using an operating band having a first frequency range (FR1), which may span from 410 MHz to 7.125 GHz. As another example, devices of the wireless network 100 may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. It is contemplated that the frequencies included in FR1 and FR2 may be modified, and techniques described herein are applicable to those modified frequency ranges.

Figure 2:
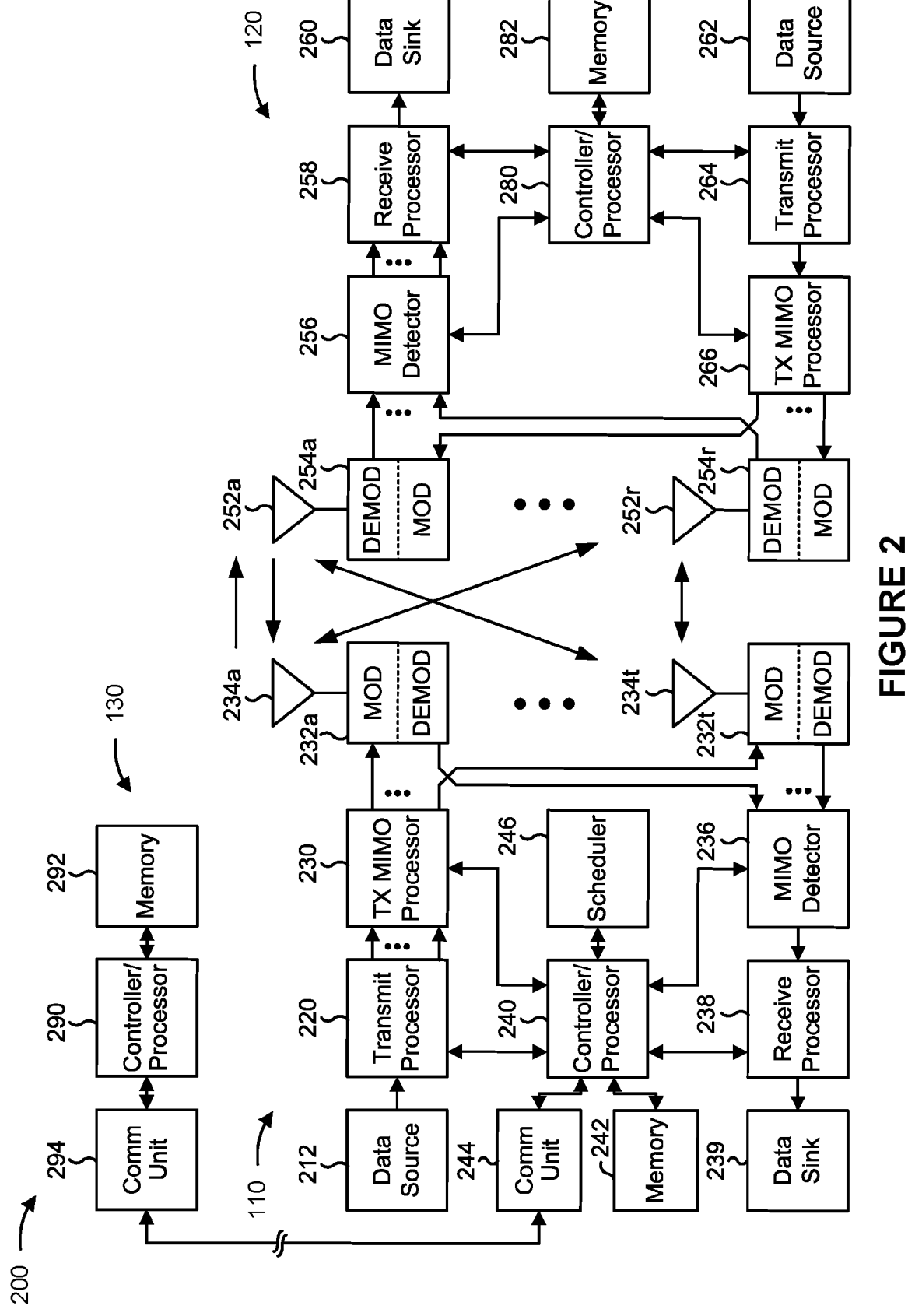
FIG. 2 is a diagram illustrating an example of a base station (BS) in communication with a user equipment (UE) in a wireless network.

FIG. 2 is a diagram illustrating an example 200 of a BS 110 in communication with a UE 120 in a wireless network 100. The BS 110 may be equipped with T antennas 234a through 234t, and the UE 120 may be equipped with R antennas 252a through 252r, where in general T≥1 and R≥1.

At the BS 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information and control information (for example, CQI requests, grants, upper layer signaling, etc.) and provide overhead symbols and control symbols. The transmit processor 220 also may generate reference symbols for reference signals and synchronization. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from the modulators 232a through 232t may be transmitted via T antennas 234a through 234t, respectively.

At the UE 120, the antennas 252a through 252r may receive the downlink signals from the BS 110 or other BSs and may provide received signals to the demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the BS 110 via the communication unit 294.

On the uplink, at the UE 120, a transmit processor 264 may receive and process data from a data source 262 and control information (for example, for reports including RSRP, RSSI, RSRQ, CQI, etc.) from a controller/processor 280. The transmit processor 264 also may generate reference symbols for one or more reference signals. The symbols from the transmit processor 264 may be precoded by a TX MIMO processor 266 if applicable, further processed by the modulators 254a through 254r (for example, for DFT-s-OFDM, CP-OFDM, etc.), and transmitted to the BS 110. In some aspects, the UE 120 includes a transceiver. The transceiver may include any combination of the antenna(s) 252, the modulators 254, the demodulators 254, the MIMO detector 256, the receive processor 258, the transmit processor 264, or the TX MIMO processor 266. The transceiver may be used by a processor (for example, the controller/ processor 280) and the memory 282 to perform aspects of any of the processes described herein.

At the BS 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include a communication unit 244 and may communicate with the network controller 130 via the communication unit 244. The BS 110 may include a scheduler 246 to schedule one or more UEs 120 for downlink communications, uplink communications, or a combination thereof. In some aspects, the BS 110 includes a transceiver. The transceiver may include any combination of the antenna(s) 234, the modulators 232, the demodulators 232, the MIMO detector 236, the receive processor 238, the transmit processor 220, or the TX MIMO processor 230. The transceiver may be used by a processor (for example, the controller/ processor 240) and a memory 242 to perform aspects of any of the processes described herein.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of the BS 110, the controller/processor 280 of the UE 120, or any other component(s) of FIG. 2 may perform one or more techniques associated with an update of transmission configurations for joint downlink and uplink TCI states, as described in more detail elsewhere herein. For example, the controller/processor 240 of the BS 110, the controller/processor 280 of the UE 120, or any other component(s) (or combinations of components) of FIG. 2 may perform or direct operations of, for example, process 700 of FIG. 7, process 800 of FIG. 8, or other processes as described herein. The memory 242 and the memory 282 may store data and program codes for the BS 110 and the UE 120, respectively. In some aspects, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the BS 110 or the UE 120, may cause the one or more processors, the UE 120, or the BS 110 to perform or direct operations of, for example, process 700 of FIG. 7, process 800 of FIG. 8, or other processes as described herein.

In some aspects, the UE (such as UE 120 or apparatus 900 of FIG. 9) may include means for receiving, from a BS, an indication of a joint downlink and uplink TCI state associated with at least one of a communication channel or a reference signal, means for communicating, with the BS, using at least one of the communication channel or the reference signal, in accordance with the joint downlink and uplink TCI state, among other examples, or combinations thereof. In some aspects, such means may include one or more components of the UE 120 described in connection with FIG. 2, such as the controller/processor 280, the transmit processor 264, the TX MIMO processor 266, the MOD 254, one or more antennas 252, the DEMOD 254, the MIMO detector 256, or the receive processor 258.

In some aspects, a BS (such as BS 110 or apparatus 1000 of FIG. 10) may include means for determining a joint downlink and uplink TCI state associated with at least one of a communication channel or a reference signal for a UE, means for transmitting, to the UE, an indication of the joint downlink and uplink TCI state, among other examples, or combinations thereof. In some aspects, such means may include one or more components of the BS 110 described in connection with FIG. 2, such as one or more antennas 234, the DEMOD 232, the MIMO detector 236, the receive processor 238, the controller/processor 240, the transmit processor 220, the TX MIMO processor 230, the MOD 232, or the antenna 234, among other examples.

While blocks in FIG. 2 are illustrated as distinct components, the functions described herein with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
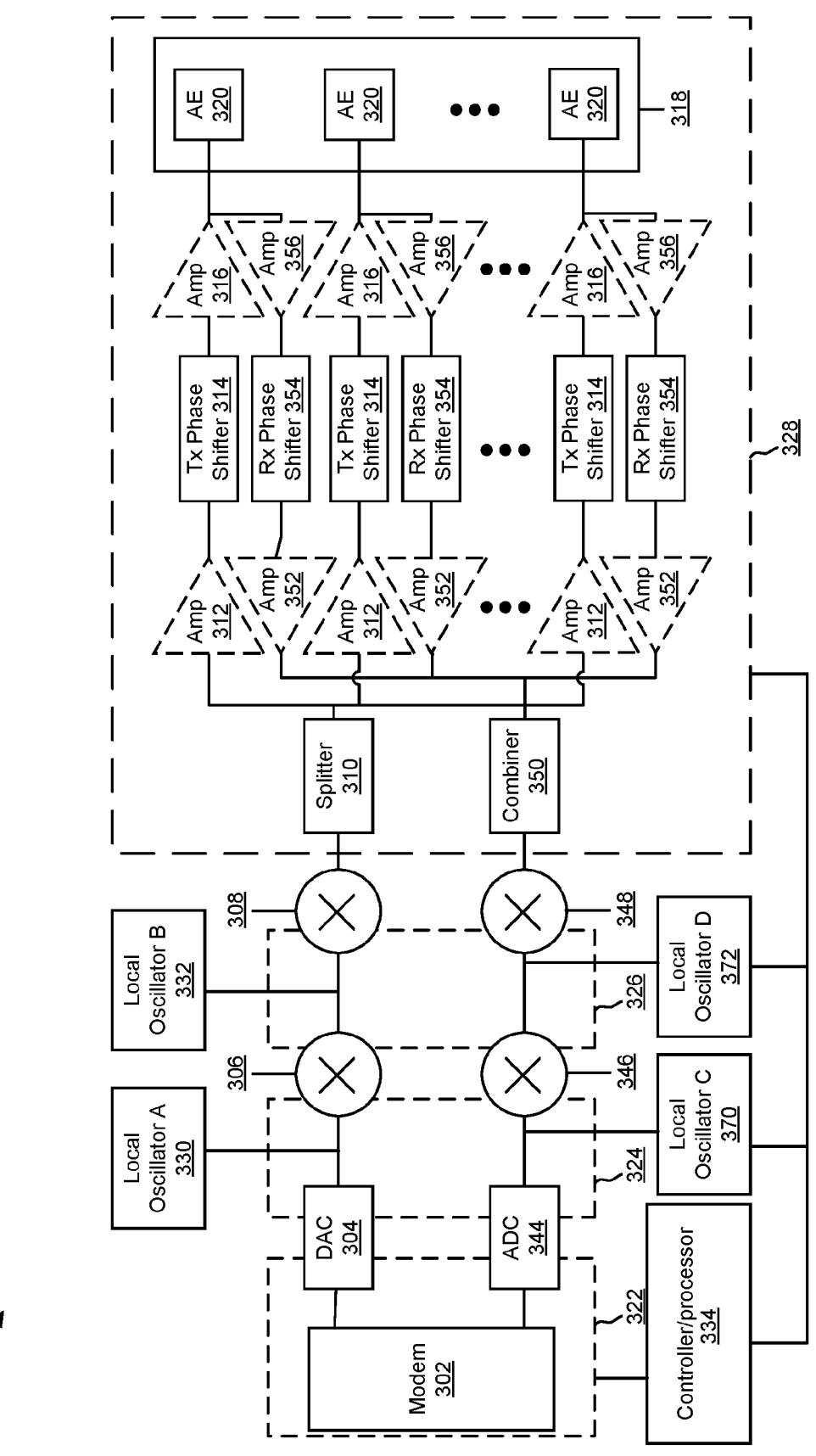
FIG. 3 is a diagram illustrating an example of beamforming architecture that supports beamforming for millimeter wave (mmW) communications.

FIG. 3 is a diagram illustrating an example beamforming architecture 300 that supports beamforming for millimeter wave (mmW) communications. In some aspects, architecture 300 may implement aspects of the wireless network 100. In some aspects, architecture 300 may be implemented in a transmitting device (for example, a first wireless communication device, UE, or BS) or a receiving device (for example, a second wireless communication device, UE, or BS), as described herein.

Broadly, FIG. 3 is a diagram illustrating example hardware components of a wireless communication device in accordance with certain aspects of the disclosure. The illustrated components may include those that may be used for antenna element selection or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, or traces, are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the BS described herein in connection with FIG. 2 or controller/processor 280 of the UE described herein in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (for example, to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 or the controller/processor 334 may adjust the frequency of local oscillator A 330 or the local oscillator B 332 so that a desired IF or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude or suppress radiation of the signal by a specific antenna element. Each of the amplifiers 312, 316 may be controlled independently (for example, by the modem 302 or the controller/processor 334) to provide independent control of the gain for each antenna element 320. For example, the modem 302 or the controller/processor 334 may have at least one control line connected to each of the splitter 310, first amplifiers 312, phase shifters 314, or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (for example, for time division duplex (TDD) operations).

The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (for example, not connected to a power source), which may result in some insertion loss. The combiner 350 may be an active combiner (for example, connected to a power source), which may result in some signal gain. When combiner 350 is an active combiner, it may provide a different (for example, configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, among other examples.

The architecture 300 is given by way of example only to illustrate an architecture for transmitting or receiving signals. In some cases, the architecture 300 or each portion of the architecture 300 may be repeated multiple times within an architecture to accommodate or provide an arbitrary number of RF chains, antenna elements, or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (for example, represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (for example, for each antenna element chain) within the second mixer 308, and the local oscillator B 332 may supply different local oscillator signals (with different phase offsets) to each IF to RF mixer.

The modem 302 or the controller/processor 334 may control one or more of the other components 304 through 372 to select one or more antenna elements 320 or to form beams for transmission of one or more signals. For example, the antenna elements 320 may be individually selected or deselected for transmission of a signal (or signals) by controlling an amplitude of one or more corresponding amplifiers, such as the first amplifiers 312 or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

Figure 4:
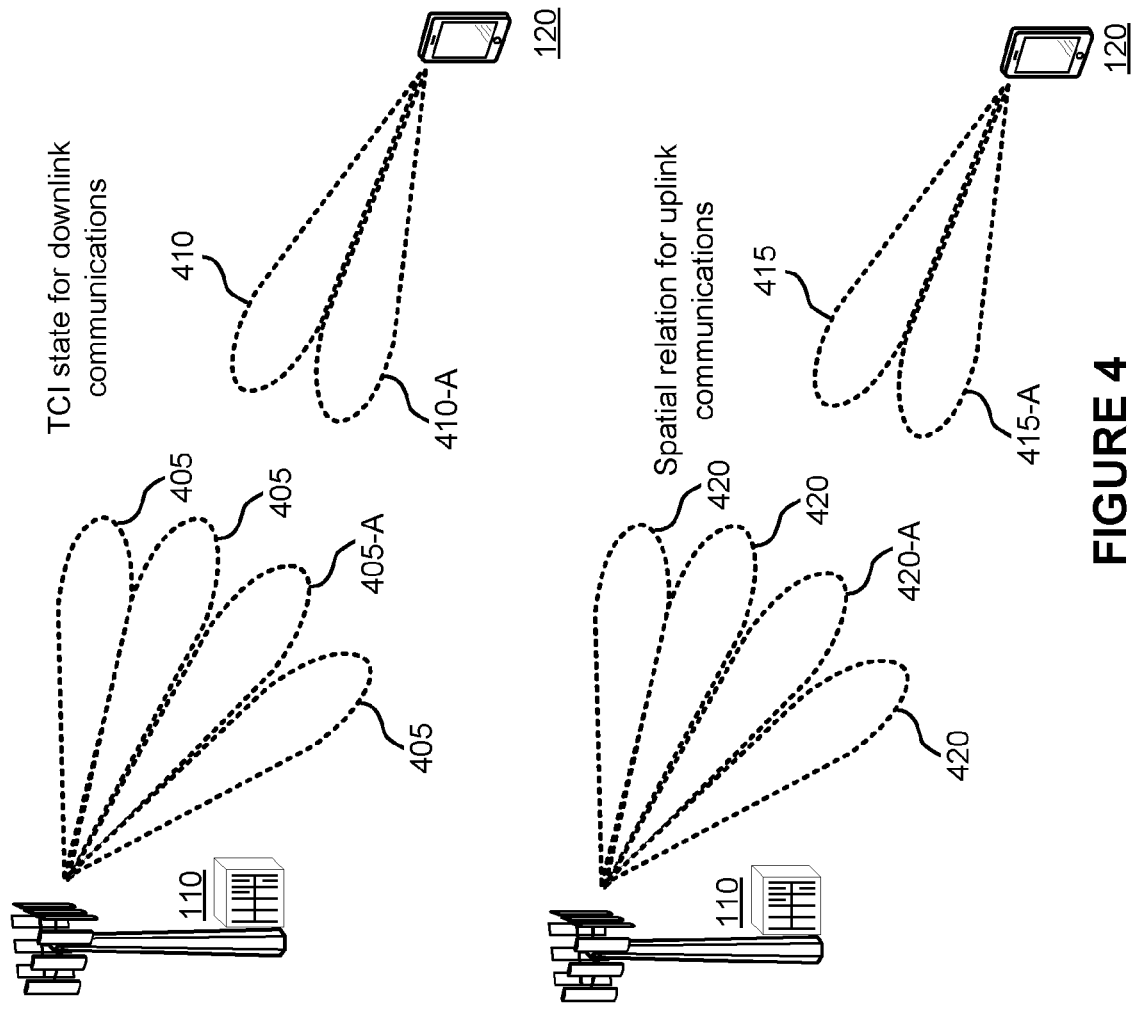
FIG. 4 is a diagram illustrating an example of using beams for communications between a BS and a UE.

FIG. 4 is a diagram illustrating an example 400 of using beams for communications between a BS and a UE. As shown in FIG. 4, a BS 110 and a UE 120 may communicate with one another.

The BS 110 may transmit to UEs 120 located within a coverage area of the BS 110. The BS 110 and the UE 120 may be configured for beamformed communications, where the BS 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The BS 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the BS 110 may select for transmissions to the UE 120. The UE 120 may thus attain and maintain a beam pair link (BPL) with the BS 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 405 may be associated with a synchronization signal block (SSB), and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The BS 110 may, in some examples, indicate a downlink BS transmit beam 405 based on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based on the BS 110 indicating a BS transmit beam 405 via a TCI indication.

The BS 110 may maintain a set of activated TCI states for downlink shared channel transmissions and a set of activated TCI states for downlink control channel transmissions. The set of activated TCI states for downlink shared channel transmissions may correspond to beams that the BS 110 uses for downlink transmission on a physical downlink shared channel (PDSCH). The set of activated TCI states for downlink control channel communications may correspond to beams that the BS 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the BS 110 using a directional UE transmit beam, and the BS 110 may receive the transmission using a directional BS receive beam. Each UE transmit beam may have an associated beam ID, beam direction, or beam symbols, among other examples. The UE 120 may transmit uplink communications via one or more UE transmit beams 415.

The BS 110 may receive uplink transmissions via one or more BS receive beams 420. The BS 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the BS 110 may transmit an indication of which UE transmit beam 415 is identified by the BS 110 as a preferred UE transmit beam, which the BS 110 may select for transmissions from the UE 120. The UE 120 and the BS 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described herein.

Figure 5:
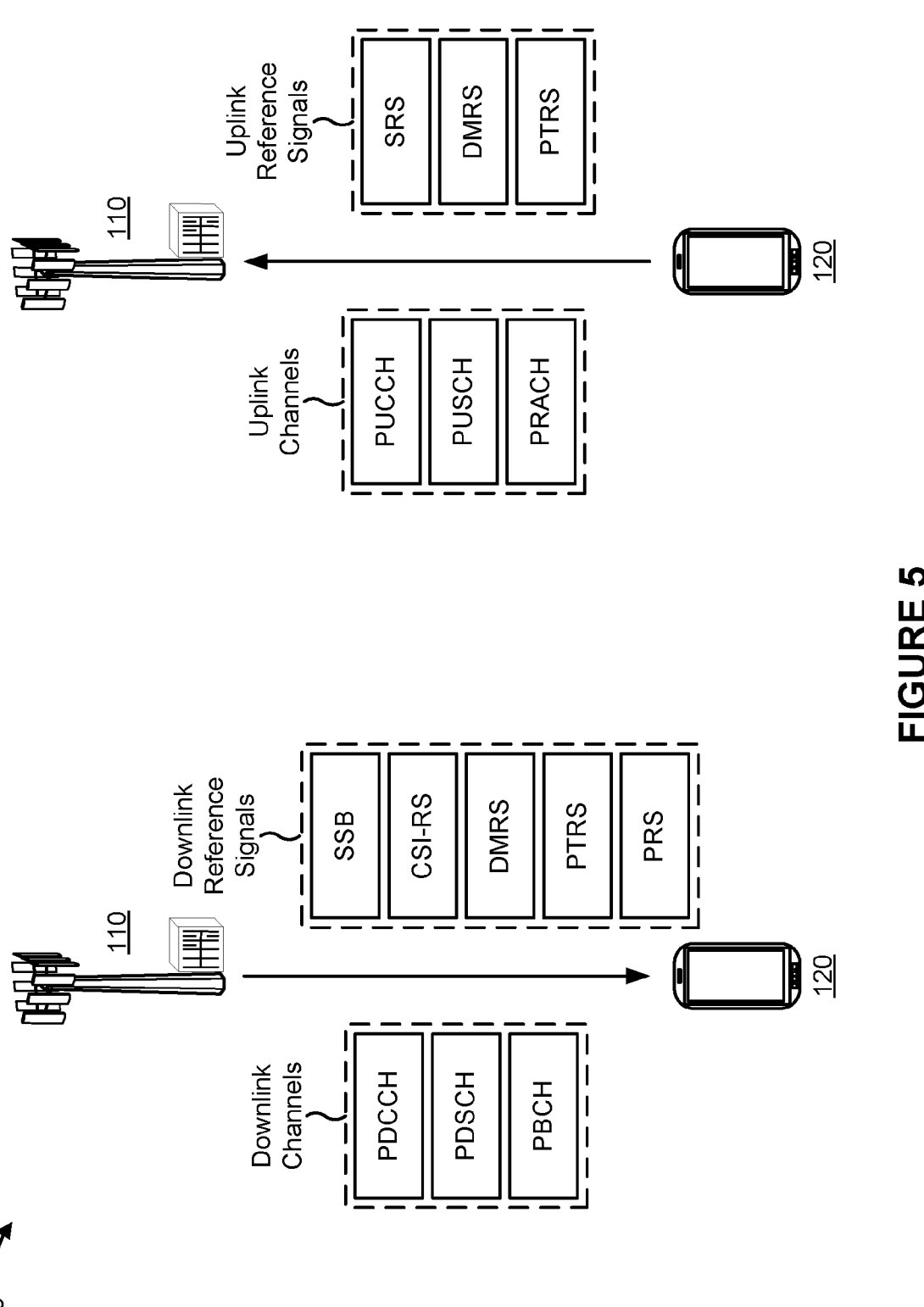
FIG. 5 is a diagram illustrating an example of physical channels and reference signals in a wireless network.

FIG. 5 is a diagram illustrating an example 500 of physical channels and reference signals in a wireless network. As shown in FIG. 5, downlink channels and downlink reference signals may carry information from a BS 110 to a UE 120, and uplink channels and uplink reference signals may carry information from a UE 120 to a BS 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (for example, ACK/NACK feedback or ACK/NACK information) in UCI on the PUCCH or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the BS 110 may transmit multiple SSBs on multiple corresponding beams, and the SSBs may be used for beam selection.

A CSI-RS may carry information used for downlink channel estimation (for example, downlink CSI acquisition), which may be used for scheduling, link adaptation, or beam management, among other examples. The BS 110 may configure a set of CSI-RSs for the UE 120, and the UE 120 may measure the configured set of CSI-RSs. Based on the measurements, the UE 120 may perform channel estimation and may report channel estimation parameters to the BS 110 (for example, in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The BS 110 may use the CSI report to select transmission parameters for downlink communications to the UE 120, such as a number of transmission layers (for example, a rank), a precoding matrix (for example, a precoder), a modulation and coding scheme (MCS), or a refined downlink beam (for example, using a beam refinement procedure or a beam management procedure), among other examples.

A DMRS may carry information used to estimate a radio channel for demodulation of an associated physical channel (for example, PDCCH, PDSCH, PBCH, PUCCH, or PUSCH). The design and mapping of a DMRS may be specific to a physical channel for which the DMRS is used for estimation. DMRSs are UE-specific, can be beam-formed, can be confined in a scheduled resource (for example, rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (for example, on the PDSCH) and uplink communications (for example, on the PUSCH).

A PRS may carry information used to enable timing or ranging measurements of the UE 120 based on signals transmitted by the BS 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (for example, a PDCCH). In general, a PRS may be designed to improve detectability by the UE 120, which may need to detect downlink signals from multiple neighboring BSs in order to perform OTDOA-based positioning. Accordingly, the UE 120 may receive a PRS from multiple cells (for example, a reference cell and one or more neighbor cells), and may report a reference signal time difference (RSTD) based on OTDOA measurements associated with the PRSs received from the multiple cells. In some aspects, the BS 110 may then calculate a position of the UE 120 based on the RSTD measurements reported by the UE 120.

An SRS may carry information used for uplink channel estimation, which may be used for scheduling, link adaptation, precoder selection, or beam management, among other examples. The BS 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The BS 110 may measure the SRSs, may perform channel estimation based on the measurements, and may use the SRS measurements to configure communications with the UE 120.

Figure 6:
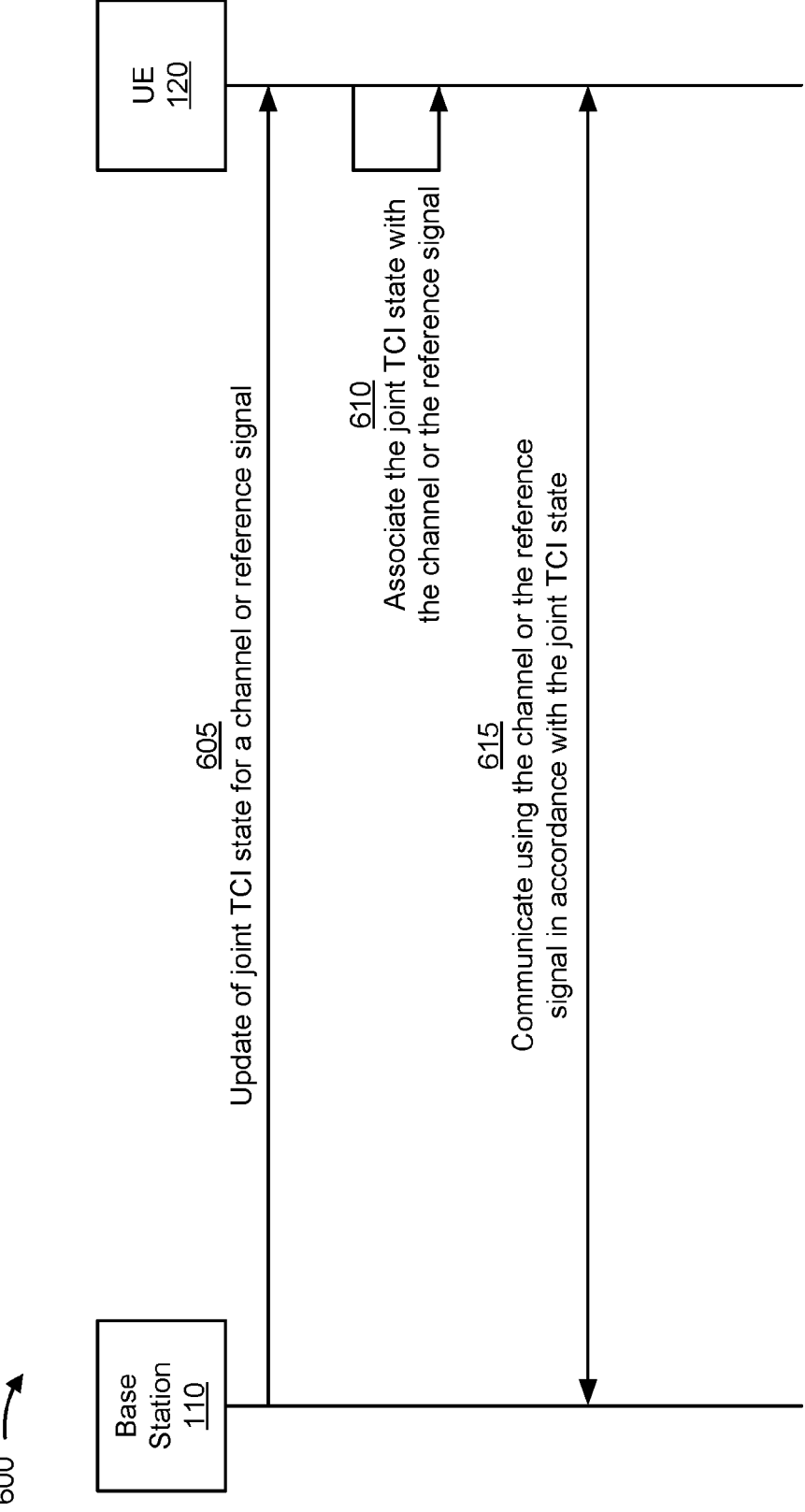
FIG. 6 is a diagram illustrating an example associated with an update of transmission configurations for joint downlink and uplink transmission configuration indicator (TCI) states.

FIG. 6 is a diagram illustrating an example 600 associated with an update of transmission configurations for joint downlink and uplink TCI states. As shown in FIG. 6, a BS 110 (such as the BS 110 depicted in, and described in connection with, FIGS. 1-5) and a UE 120 (such as the UE 120 depicted in, and described in connection with, FIGS. 1-5) may communicate with one another.

As shown by reference number 605, the BS 110 may transmit, and the UE 120 may receive, an indication of a joint downlink and uplink (DL/UL) TCI state associated with at least one of a communication channel or a reference signal. A joint DL/UL TCI state may indicate a common beam for multiple downlink resources (for example, multiple downlink channels or multiple downlink reference signals) or for multiple uplink resources (for example, multiple uplink channels or multiple uplink reference signals) to conserve beam indication overhead and to reduce latency associated with beam indications. For example, a joint DL/UL TCI state may indicate a common beam for data communications between the BS 110 and the UE 120 (for example, for both downlink data communications and uplink data communications) or for control communications between the BS 110 and the UE 120 (for example, for both downlink control communications and uplink control communications).

The BS 110 may determine a joint DL/UL TCI state associated with at least one of a communication channel or a reference signal for the UE 120. For example, the BS 110 may determine that a joint DL/UL TCI state is to be applied to a communication channel or a reference signal by the UE 120. The BS 110 may transmit an indication of the joint DL/UL TCI state, as described herein.

A joint DL/UL TCI state may indicate one or more reference signals providing one or more properties of a common beam. The one or more reference signals, indicated by the TCI, may include a synchronization signal (such as an SSB), a CSI-RS, an SRS, a PRS, a PRACH, a DMRS, or a combination thereof. The DMRS may include a DMRS for a PDSCH, a PDCCH, a PUSCH, a PUCCH, or other similar channels. The one more reference signals may provide one or more properties for the common beam through one or more QCL rules. For example, the TCI may include one or more QCL-Info data structures, as defined by the 3GPP specifications, or other similar data structures, that define the QCL rules. The QCL rules may indicate the one or more properties provided by the one or more reference signals.

The one or more properties for the common beam may be spatial, temporal, or otherwise related to a physical property of the common beam. For example, the one or more properties may include a Doppler shift (such as when the QCL rule is a QCL-TypeA assumption, a QCL-TypeB assumption, or a QCL-TypeC assumption), a Doppler spread (such as when the QCL rule is a QCL-TypeA assumption or a QCL-TypeB assumption), an average delay (such as when the QCL rule is a QCL-TypeA assumption or a QCL-TypeC assumption), a delay spread (such as when the QCL rule is a QCL-TypeA assumption), a spatial reception filter (such as when the QCL rule is a QCL-TypeD assumption), spatial relation information for transmission, or a combination thereof.

In some aspects, the joint DL/UL TCI state may indicate a plurality of beams. For example, the joint DL/UL TCI state may indicate a plurality of sets, each set having one or more reference signals, that correspond to the plurality of beams. Accordingly, each beam may be indicated using one or more QCL-Info data structures, as defined by the 3GPP specifications, or other similar data structures, that define QCL rules for that beam. Accordingly, the TCI transmitted by the BS 110 may be larger than the TCI-State data structure as defined in the 3GPP specifications.

Additionally, or alternatively, the joint DL/UL TCI state may further indicate at least one bandwidth part (BWP) identifier associated with at least one of the one or more reference signals. For example, the TCI may include a bwp-Id data variable, as defined by the 3GPP specifications, or other similar data variable. By default (for example, when the BWP identifier is not indicated), the UE 120 may apply the TCI to a BWP that is currently active for downlink communications from the BS 110 and a BWP that is currently active for uplink communications to the BS 110.

Additionally, or alternatively, the joint DL/UL TCI state may further indicate one or more power control parameters for the UE 120 to use when transmitting. The one or more power control parameters may include a pathloss reference signal (such as a CSI-RS or other reference signal), a nominal power parameter (such a PO or other nominal power), a pathloss scaling factor (such as a or other scaling factor), a close-loop index, an identifier of a power control group (such as a PC group ID), or a combination thereof. In some aspects, as described herein, the TCI may indicate a plurality of beams. Accordingly, each beam of the plurality of beams may share the one or more power control parameters. As an alternative, at least one beam of the plurality of beams may use one or more different power control parameters.

Additionally, or alternatively, the joint DL/UL TCI state may further indicate one or more timing advance (TA) parameters for the UE 120 to use when transmitting. The one or more TA parameters may include a TA value, an identifier of a TA group (such as a TA group ID), or a combination thereof. In some aspects, as described herein, the joint DL/UL TCI state may indicate a plurality of beams. Accordingly, each beam of the plurality of beams may share the one or more TA parameters. As an alternative, at least one beam of the plurality of beams may use one or more different TA parameters.

Additionally, or alternatively, the joint DL/UL TCI state may further indicate one or more codebook or non-codebook parameters for the UE 120 to use when transmitting. The one or more codebook or non-codebook parameters may include an SRS resource indicator (SRI); a precoding matrix indicator (PMI), such as a transmission PMI (TPMI); a rank indicator (RI), such as a transmission rank indicator (TRI); or a combination thereof. In some aspects, as described herein, the joint DL/UL TCI state may indicate a plurality of beams. Accordingly, each beam of the plurality of beams may share the one or more codebook or non-codebook parameters. As an alternative, at least one beam of the plurality of beams may use one or more different codebook or non-codebook parameters. For example, the codebook parameters may be used in codebook based uplink MIMO transmission, and the non-codebook parameters may be used in non-codebook based uplink MIMO transmission.

Additionally, or alternatively, the joint DL/UL TCI state may further indicate one or more identifiers of one or more antenna panels associated with the UE 120. The one or more antenna panels may include a plurality of antenna panels, and each panel may use a different analog beam, a different uplink power control parameter, a different uplink TA parameter, or a combination thereof. In some aspects, the one or more identifiers may include an identifier of an antenna port group (such as an antenna port group ID), an identifier of a beam group (such as a beam group ID), or other identifier.

In some aspects, the one or more identifiers may include at least one identifier associated with downlink communications and at least one identifier associated with uplink communications. Accordingly, the UE 120 may use one or more different antenna panels for uplink communications than downlink communications. Additionally, or alternatively, the UE 120 may use one or more same antenna panels for uplink and downlink communications but associated with different identifiers for uplink communications than downlink communications.

The indication of the joint DL/UL TCI state that is to be associated with at least one of a communication channel or a reference signal may be an update of a joint DL/UL TCI state for the channel or for the reference signal. For example, the BS 110 may transmit an indication of a joint DL/UL TCI state that is to be applied to a communication channel or a reference signal. In some aspects, the BS 110 may transmit an indication of a joint DL/UL TCI state that is to be activated for a communication channel or a reference signal. The indication from the BS 110 may include an indication of one or more communication channels or one or more reference signals that the joint DL/UL TCI state is to be associated with.

The one or more communication channels may include downlink channels, such as a PDCCH, a dynamic grant PDSCH (for example, a PDSCH scheduled by DCI), or a semi-persistent scheduling (SPS) PDSCH (for example, a semi-persistent PDSCH or a periodic PDSCH), among other examples. The communication channel may include uplink channels, such as a periodic, a semi-persistent, or an aperiodic PUCCH, a periodic, a semi-persistent, or an aperiodic PUSCH, or a PRACH, among other examples.

The one or more reference signals may include downlink reference signals, such as a periodic, a semi-persistent, or an aperiodic CSI-RS, a periodic, a semi-persistent, or an aperiodic PRS, among other examples. The reference signal may include uplink reference signals, such as a periodic, a semi-persistent, or an aperiodic SRS, among other examples.

In some aspects, the BS 110 may indicate multiple joint DL/UL TCI states to the UE 120 in an RRC configuration. In some aspects, the BS 110 may transmit the indication of the joint DL/UL TCI state (for example, from the multiple joint DL/UL TCI states configured by the RRC configuration) that is to be associated with at least one of a communication channel or a reference signal using an RRC message.

In some aspects, the BS 110 may transmit the indication of the joint DL/UL TCI state that is to be associated with at least one of a communication channel or a reference signal using a medium access control (MAC) control element (MAC-CE) message. In some aspects, the MAC-CE message may indicate a joint DL/UL TCI state from the multiple joint DL/UL TCI states configured by the RRC configuration (for example, the joint DL/UL TCI state indicated by the MAC-CE message may be one candidate joint DL/UL TCI state configured by RRC). The MAC-CE message may be associated with an activation time. The activation time may be an amount of time after an acknowledgment (ACK) message associated with the MAC-CE message, that is transmitted by the UE 120, that the joint DL/UL TCI state is to be applied to the communication channel or reference signal. For example, the UE 120 may receive the MAC-CE message, decode the MAC-CE message, and determine that the MAC-CE message was successfully received by the UE 120. The UE 120 may transmit an ACK message to the BS 110 indicating that the MAC-CE message was successfully received. The activation time may be such that the joint DL/UL TCI state is to be applied X milliseconds after the end of the ACK message. For example, the activation time can be 3 milliseconds (ms), within 1 to 5 ms, 0.5 to 10 ms, etc., among other examples. In some aspects, the activation time may be defined, or otherwise, fixed, in the 3GPP specifications.

In some aspects, the BS 110 may transmit the indication of the joint DL/UL TCI state that is to be associated with at least one of a communication channel or a reference signal using a DCI message. In some aspects, the joint DL/UL TCI state indicated by the DCI message may be one candidate joint DL/UL TCI state that is activated by a MAC-CE message. For example, the BS 110 may transmit, and the UE 120 may receive, a MAC-CE message that activates a set of candidate joint DL/UL TCI states (for example, from the multiple joint DL/UL TCI states configured via RRC). The DCI may indicate a candidate joint DL/UL TCI state from the set of activated candidate joint DL/UL TCI states.

The DCI message may be associated with an activation time. The activation time may be an amount of time after the end of the DCI that the joint DL/UL TCI state is to be applied to the communication channel or reference signal. For example, the activation time may be such that the joint DL/UL TCI state is to be applied X milliseconds after the end of the DCI message. In some aspects, the activation time may be an amount of time after an ACK message associated with the DCI message, that is transmitted by the UE 120, that the joint DL/UL TCI state is to be applied to the communication channel or reference signal. For example, the UE 120 may receive the DCI message, decode the DCI message, and determine that the DCI message was successfully received by the UE 120. The UE 120 may transmit an ACK message to the BS 110 indicating that the DCI message was successfully received. The activation time may be such that the joint DL/UL TCI state is to be applied X milliseconds after the end of the ACK message.

In some aspects, the BS 110 may indicate a usage associated with the joint DL/UL TCI state. The usage may indicate a communication direction (for example, the downlink communication direction or the uplink communication direction) associated with the joint DL/UL TCI state. For example, the usage may indicate that the joint DL/UL TCI state is to be used for downlink communications only, uplink communications only, or for both downlink communications and uplink communications. In some aspects, the indication of the usage may be included in the indication of the joint DL/UL TCI state. In some aspects, the indication of the usage may be a separate indication from the indication of the joint DL/UL TCI state.

In some aspects, the usage may be indicated by an RRC configured indicator. The RRC configured indicator may be included inside each configured joint DL/UL TCI state (for example, inside the indication of the joint DL/UL TCI state). For example, the RRC configured indicator may be a field included in the indication of the joint DL/UL TCI state. In some aspects, the RRC configured indicator may be configured outside of the indication of the joint DL/UL TCI state. For example, the RRC configured indicator may be a separate information element included in an RRC message associated with the joint DL/UL TCI state.

In some aspects, the usage may be indicated by a MAC-CE message. For example, a MAC-CE message indicating the joint DL/UL TCI state may include an indication of the usage associated with the joint DL/UL TCI state. In some aspects, a MAC-CE may activate multiple joint DL/UL TCI states. The MAC-CE message may include an indication of a usage for each joint DL/UL TCI state of the multiple joint DL/UL TCI states (for example, the MAC-CE message may include a usage indicator per joint DL/UL TCI state). In some aspects, a separate MAC-CE message (for example, from the MAC-CE activating a joint DL/UL TCI state) may indicate the usage associated with the joint DL/UL TCI state. For example, the separate MAC-CE message may include a usage indicator per joint DL/UL TCI state associated with the separate MAC-CE (for example, a usage indicator for each joint DL/UL TCI state indicated by the MAC-CE message).

In some aspects, the usage may be indicated by a DCI message. For example, a DCI indicating the joint DL/UL TCI state may include an indication of the usage associated with the joint DL/UL TCI state. As described herein, a DCI message may indicate (for example, select) one or more joint DL/UL TCI states from a set of multiple joint DL/UL TCI states activated by a MAC-CE message. The DCI message may include a usage indicator per joint DL/UL TCI state (for example, a usage indicator for each joint DL/UL TCI state indicated by the DCI message). In some aspects, the usage associated with a joint DL/UL TCI state may be indicated by a separate DCI message (for example, a separate DCI message from the DCI message indicating the joint DL/UL TCI state). The separate DCI message may include a usage indicator for each joint DL/UL TCI state associated with the separate DCI message.

In some aspects, the BS 110 may indicate one or more transmission types associated with the joint DL/UL TCI state or one or more transmission resources associated with the joint DL/UL TCI state. In some aspects, the one or more transmission types associated with the joint DL/UL TCI state or the one or more transmission resources associated with the joint DL/UL TCI state may be based on the usage associated with the joint DL/UL TCI state. For example, if a usage associated with a joint DL/UL TCI state is downlink communications only, or both downlink communications and uplink communications, the BS 110 may indicate one or more downlink transmission types associated with the joint DL/UL TCI state or the one or more downlink transmission resources associated with the joint DL/UL TCI state. If a usage associated with a joint DL/UL TCI state is uplink communications only, or both downlink communications and uplink communications, the BS 110 may indicate one or more uplink transmission types associated with the joint DL/UL TCI state or one or more uplink transmission resources associated with the joint DL/UL TCI state.

In some aspects, the indication of the one or more transmission types associated with the joint DL/UL TCI state or the one or more transmission resources associated with the joint DL/UL TCI state may be included in the indication of the usage associated with the joint DL/UL TCI state. In some aspects, the indication of the one or more transmission types associated with the joint DL/UL TCI state or the one or more transmission resources associated with the joint DL/UL TCI state may be a separate indication from the indication of the usage associated with the joint DL/UL TCI state. The BS 110 may transmit the indication of the one or more transmission types associated with the joint DL/UL TCI state or the one or more transmission resources associated with the joint DL/UL TCI state via an RRC message, a MAC-CE message, or a DCI message, among other examples. In some aspects, the BS 110 may transmit the indication of the one or more transmission types associated with the joint DL/UL TCI state or the one or more transmission resources associated with the joint DL/UL TCI state in a similar (or the same) manner as described herein in connection with the indication of the usage associated with the joint DL/UL TCI state.

The one or more downlink transmission types may include PDSCH transmissions. For example, the BS 110 may indicate that the joint DL/UL TCI state is associated with all PDSCH transmission types associated with the UE 120 (for example, dedicated to the UE 120). In some aspects, the BS 110 may indicate that the joint DL/UL TCI state is associated with a subset of PDSCH transmission types, of all PDSCH transmission types associated with the UE 120. If the BS 110 indicates that the joint DL/UL TCI state is associated with a subset of PDSCH transmission types, the BS 110 may indicate the PDSCH transmission types included in the subset of PDSCH transmission types. The PDSCH transmission types may include SPS PDSCH transmissions (for example, semi-persistent PDSCH transmissions or periodic PDSCH transmissions), dynamic grant PDSCH transmissions (for example, PDSCH transmissions scheduled by DCI), dynamic grant PDSCH transmissions with a scheduling offset that is less than a beam switch latency threshold, or dynamic grant PDSCH transmissions with a scheduling offset that is greater than or equal to the beam switch latency threshold, among other examples.

The one or more downlink transmission resources may include one or more CORESETs, one or more search spaces, or one or more CSI-RS resource sets, among other examples. The BS 110 may indicate that a joint DL/UL TCI state is associated with all configured CORESETs or a subset of configured CORESETs. If the BS 110 indicates that the joint DL/UL TCI state is associated with a subset of configured CORESETs, the BS 110 may indicate CORESET indexes of CORESETs included in the subset of configured CORESETs.

The BS 110 may indicate that a joint DL/UL TCI state is associated with all configured search spaces or a subset of configured search spaces. If the BS 110 indicates that the joint DL/UL TCI state is associated with a subset of configured search spaces, the BS 110 may indicate search space indexes of search spaces included in the subset of configured search spaces or search space types of search spaces included in the subset of configured search spaces. Search space types may include UE-specific search spaces (USSs) or common search spaces (CSSs), among other examples.

The BS 110 may indicate that a joint DL/UL TCI state is associated with all configured CSI-RS resource sets or a subset of configured CSI-RS resource sets. If the BS 110 indicates that the joint DL/UL TCI state is associated with a subset of configured CSI-RS resource sets, the BS 110 may indicate resource identifiers of CSI-RS resource sets included in the subset of configured CSI-RS resource sets or CSI-RS resource set types of CSI-RS resource sets included in the subset of configured CSI-RS resource sets. CSI-RS resource set types may include: periodic CSI-RS resource sets, semi-persistent CSI-RS resource sets, aperiodic CSI-RS resource sets, CSI-RS resource sets for beam management, CSI-RS resource sets associated with tracking reference signals, or CSI-RS resource sets for channel state feedback, among other examples.

The one or more uplink transmission types may include PUSCH transmissions, PUCCH transmissions, or PRACH transmissions, among other examples. For example, the BS 110 may indicate that the joint DL/UL TCI state is associated with all PUSCH transmission types associated with the UE 120 (for example, dedicated to the UE 120) or a subset of PUSCH transmission types, of all PUSCH transmission types associated with the UE 120. If the BS 110 indicates that the joint DL/UL TCI state is associated with a subset of PUSCH transmission types, the BS 110 may indicate the PUSCH transmission types included in the subset of PUSCH transmission types. The PUSCH transmission types may include configured grant (CG) PUSCH transmissions, dynamic grant PUSCH transmissions (for example, PUSCH transmissions scheduled by DCI), codebook based PUSCH transmissions, or non-codebook based PUSCH transmissions, among other examples.

The BS 110 may indicate that the joint DL/UL TCI state is associated with all PUCCH transmission types or PUCCH transmission resources associated with the UE 120 (for example, dedicated to the UE 120) or a subset of PUCCH transmission types or PUCCH transmission resources. If the BS 110 indicates that the joint DL/UL TCI state is associated with a subset of PUCCH transmission types or PUCCH transmission resources, the BS 110 may indicate the PUCCH transmission types of the PUCCH resource identifiers of the PUCCH transmission types or PUCCH transmission resources included in the subset. PUCCH transmission types may include periodic PUCCH transmissions, semi-persistent PUCCH transmissions, or aperiodic PUCCH transmissions, among other examples.

The one or more uplink transmission resources may include SRS resource sets or PRACH resource sets, among other examples. For example, the BS 110 may indicate that the joint DL/UL TCI state is associated with all configured SRS resource sets or a subset of configured SRS resource sets. If the BS 110 indicates that the joint DL/UL TCI state is associated with a subset of configured SRS resource sets, the BS 110 may indicate resource identifiers associated with SRS resource sets included in the subset of configured SRS resource sets or SRS resource set types of SRS resource sets included in the subset of configured SRS resource sets. SRS resource set types may include periodic SRS resource sets, semi-persistent SRS resource sets, periodic SRS resource sets, SRS resource sets for codebook based uplink transmissions, SRS resource sets for non-codebook based uplink transmissions, SRS resource sets associated with an antenna switching procedure, or SRS resource sets for beam management, among other examples.

The BS 110 may indicate that the joint DL/UL TCI state is associated with all configured PRACH resources or PRACH types. In some aspects, the BS 110 may indicate that the joint DL/UL TCI state is associated with a subset of configured PRACH resources or a subset of PRACH types. If the BS 110 indicates that the joint DL/UL TCI state is associated with a subset of configured PRACH resources or a subset of PRACH types, the BS 110 may indicate resource identifiers of PRACH resources included in the subset of configured PRACH resources or PRACH types included in the subset of PRACH types. PRACH types may include contention free random access (CFRA) PRACH transmissions, contention based random access (CBRA) PRACH transmissions, or PRACH transmissions that are not associated with a beam failure recovery (BFR) purpose, among other examples.

As shown by reference number 610, the UE 120 may associate the joint DL/UL TCI state with the communication channel or the reference signal, as indicated by the BS 110. For example, the UE 120 may apply the joint DL/UL TCI state to the communication channel or the reference signal. In some aspects, the UE 120 may activate the joint DL/UL TCI state for the communication channel or the reference signal. In some aspects, the UE 120 may associate the joint DL/UL TCI state with the communication channel or the reference signal after an amount of time indicated by an activation time associated with a message (for example, a MAC-CE message or a DCI message) that indicates the joint DL/UL TCI state. For example, the UE 120 may associate the joint DL/UL TCI state with the communication channel or the reference signal X milliseconds (for example, the activation time) after transmitting an ACK message associated with a MAC-CE message that indicates the joint DL/UL TCI state.

The UE 120 may associate the joint DL/UL TCI state with a usage, as indicated by the BS 110. For example, the UE 120 may associate the joint DL/UL TCI state with a downlink only usage, an uplink only usage, or both a downlink usage and an uplink usage. In some aspects, the UE 120 may associate the joint DL/UL TCI state with one or more downlink transmission types or one or more downlink transmission resources, as indicated by the BS 110. In some aspects, the UE 120 may associate the joint DL/UL TCI state with one or more uplink transmission types or one or more uplink transmission resources, as indicated by the BS 110.

The BS 110 may associate the joint DL/UL TCI state with a communication channel, a reference signal, a usage, one or more downlink transmission types, one or more downlink transmission resources, one or more uplink transmission types, or one or more uplink transmission resources in a similar manner as described herein in connection with the UE 120. For example, the BS 110 may update a set of activated TCI states stored by the BS 110.

As shown by reference number 615, the BS 110 and the UE 120 may communicate (for example, transmit communications or receive communications) using the channel or using the reference signal in accordance with the joint DL/UL TCI state. For example, the BS 110 and the UE 120 may communicate using a common beam indicated by the joint DL/UL TCI state. In some aspects, the BS 110 may transmit, and the UE 120 may receive, a downlink communication using a common beam indicated by the joint DL/UL TCI state. In some aspects, the UE 120 may transmit, and the BS 110 may receive, an uplink communication using a common beam indicated by the joint DL/UL TCI state. The BS 110 and the UE 120 may communicate in accordance with a usage associated with the joint DL/UL TCI state, transmission types associated with the joint DL/UL TCI state, or transmission resources associated with the joint DL/UL TCI state, among other examples.

In some aspects, as described herein, the joint DL/UL TCI state may indicate a plurality of beams. Accordingly, the BS 110 and the UE 120 may use each beam of the plurality of beams as a common beam. For example, the UE 120 and the BS 110 may use beamforming hardware (such as that described herein in connection with FIG. 3) to exchange uplink data or control information and downlink data or control information consistent with the one or more properties indicated by the joint DL/UL TCI state.

Accordingly, the techniques and apparatuses described in connection with FIG. 6 may be used to update a joint DL/UL TCI state for a communication channel or a reference signal. The BS 110 may indicate a joint DL/UL TCI state for a communication channel or a reference signal. The BS 110 may indicate a usage associated with the joint DL/UL TCI state. Additionally, the BS 110 may indicate transmission types or transmission resources associated with the joint DL/UL TCI state. Accordingly, the UE may apply the joint DL/UL TCI state to a channel or reference signal as indicated by the BS. This enables the UE to utilize a common beam indicated by the joint DL/UL TCI state. As a result, the UE and the BS may reduce signaling and network overhead by using a single TCI to indicate properties of a common beam for both downlink and uplink.

As described herein, a joint DL/UL TCI state for a communication channel or a reference signal may be updated as follows:

The signaling to update a joint DL/UL TCI state for a channel/reference signal (RS) can have the following options:

Option 1—update via RRC message.

Option 2—update via MAC-CE. Action time for the joint TCI state to be applied may be X milliseconds after the end of ACK for the MAC-CE. The joint TCI state updated by the MAC-CE may be one candidate joint TCI state configured by RRC.

Option 3—update via DCI. Action time for the joint TCI state to be applied can be X milliseconds after the end of DCI, or after the end of ACK for the DCI if dedicated ACK/NACK is associated with the DCI. A joint TCI state updated by DCI may be one candidate joint TCI state activated by a MAC-CE.

Each of above options may be applied to the following channels/RSs: PDCCH, PDSCH scheduled by DCI, SPS, periodic/semi-persistent/aperiodic (P/SP/AP) CSI-RS & PRS (positioning), P/SP/AP PUCCH, PUSCH, & SRS, PRACH.

The BS 110 may also indicate a joint DL/UL TCI state to be used as DL only, UL only, or joint DL/UL TCI state with the following options:

Option 2-1: The usage may be indicated by an RRC configured indicator. This indicator can be inside each configured joint DL/UL TCI state, such as a field in the TCI state. This indicator can be configured outside the joint DL/UL TCI state, such as in a separate information element (IE).

Option 2-2: The usage may be indicated by a MAC-CE. Option 2-2-1: The MAC-CE activating joint DL/UL TCI state may have an indicator per TCI state. Option 2-2-2: A separate MAC-CE may have an indicator per TCI state.

Option 2-3: The usage can be indicated by a DCI. Option 2-3-1: The DCI down selecting at least one activated joint DL/UL TCI state may have an indicator per selected TCI. Option 2-3-2: A separate DCI may have an indicator per TCI state.

For the indicated usage, the BS 110 may further indicate the applicable DL/UL transmission types/resources, such as via RRC in Option 2-1, via MAC-CE in Option 2-2, or via DCI in Option 2-3.

If the usage is DL only or joint DL/UL TCI state, the BS 110 may further indicate the applicable DL transmission types/resources, which include: all or a subset of UE-dedicated PDSCH, and the PDSCH types in case of a subset; all or a subset of CORESETs, and the CORESET indexes in case of a subset; all or a subset of search spaces (SSs), and the SS indexes or types in case of a subset; or all or a subset of CSI-RS resources or types, and the resource IDs or types in case of a subset. The types of PDSCHs include SPS, and DCI scheduled PDSCH with scheduling offset between DCI and PDSCH less than (or greater than or equal to) the beam switch latency threshold. The types of search spaces include USS and CSS. The types of CSI-RS resources include P/SP/AP CSI-RS for BM, tracking reference signal (TRS), and channel state feedback (CSF).

If the usage is UL only or joint DL/UL TCI state, the BS 110 may further indicate the applicable UL transmission types/resources, which include: all or a subset of UE-dedicated PUSCH, and the PUSCH types in case of a subset; all or a subset of PUCCHs, and the PUCCH resource IDs or types in case of a subset; all or a subset of SRS resources or types, and the resource IDs or types in case of a subset; or all or a subset of PRACH or types, and the resource IDs or types in case of a subset. The types of PUSCHs include CG, and DCI scheduled PUSCH, which can be codebook and non-codebook based. The types of PUCCH include P/SP/AP PUCCH. The types of SRS resources include P/SP/AP SRS for CodeBook, Non-CodeBook, AntennaSwitching, and beam management (BM). The types of PRACH include CFRA/CBRA PRACH (not for BFR purposes).

Figure 7:
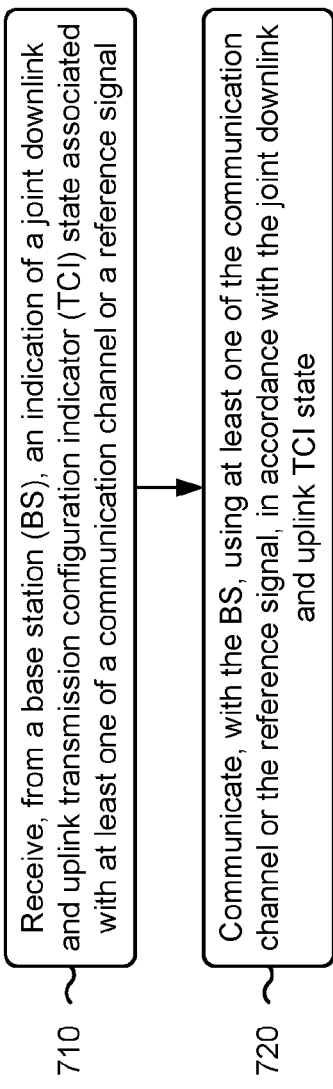
FIG. 7 is a diagram illustrating an example process performed, for example, by a UE.
Figure 7:

FIG. 7 is a diagram illustrating an example process 700 performed, for example, by a UE. The process 700 is an example where the UE (such as the UE 120 depicted in, and described in connection with, FIGS. 1-6) performs operations associated with update of transmission configurations for joint downlink and uplink TCI states.

As shown in FIG. 7, in some aspects, the process 700 may include receiving, from a BS (such as the BS 110 depicted in, and described in connection with, FIGS. 1-6), an indication of a joint downlink and uplink TCI state associated with at least one of a communication channel or a reference signal (block 710). For example, the UE (such as by using reception component 902, depicted in FIG. 9) may receive, from a BS, an indication of a joint downlink and uplink TCI state associated with at least one of a communication channel or a reference signal, as described herein. For example, the reception component 902 can be configured to obtain from a BS, an indication of a joint downlink and uplink TCI state associated with at least one of a communication channel or a reference signal.

As further shown in FIG. 7, in some aspects, the process 700 may include communicating, with the BS, using at least one of the communication channel or the reference signal, in accordance with the joint downlink and uplink TCI state (block 720). For example, the UE (such as by using communication component 908, reception component 902, or transmission component 904, depicted in FIG. 9) may communicate, with the BS, using at least one of the communication channel or the reference signal, in accordance with the joint downlink and uplink TCI state, as described herein. For example, the communication component 908 may cause the reception component 902 to receive a communication, from the BS, using at least one of the communication channel or the reference signal, in accordance with the joint downlink and uplink TCI state. The communication component 908 may cause the transmission component 904 to transmit a communication, to the BS, using at least one of the communication channel or the reference signal, in accordance with the joint downlink and uplink TCI state. The reception component 902 can be configured to obtain a communication, from the BS, using at least one of the communication channel or the reference signal, in accordance with the joint downlink and uplink TCI state. The transmission component 904 can be configured to output a communication, to the BS, using at least one of the communication channel or the reference signal, in accordance with the joint downlink and uplink TCI state.

The process 700 may include additional aspects, such as any single aspect or any combination of aspects described herein or in connection with one or more other processes described elsewhere herein.

In a first additional aspect, receiving the indication of the joint downlink and uplink TCI state occurs via an RRC message.

In a second additional aspect, alone or in combination with the first aspect, receiving the indication of the joint downlink and uplink TCI state occurs via a MAC-CE message. In a third additional aspect, alone or in combination with one or more of the first and second aspects, the process 700 includes transmitting, to the BS, an acknowledgement feedback message associated with the MAC-CE message, and associating the joint downlink and uplink TCI state with at least one of the communication channel or the reference signal after an amount of time, indicated by an action time associated with the MAC-CE message, after transmitting the acknowledgement feedback message.

In a fourth additional aspect, alone or in combination with one or more of the first through third aspects, the process 700 includes receiving, from the BS, an RRC configuration indicating a set of candidate joint downlink and uplink TCI states, and the MAC-CE message indicates a candidate joint downlink and uplink TCI state from the set of candidate joint downlink and uplink TCI states indicated by the RRC configuration.

In a fifth additional aspect, alone or in combination with one or more of the first through fourth aspects, receiving the indication of the joint downlink and uplink TCI state occurs via a DCI message. In a sixth additional aspect, alone or in combination with one or more of the first through fifth aspects, the process 700 includes associating the joint downlink and uplink TCI state with at least one of the communication channel or the reference signal after an amount of time, indicated by an action time associated with the DCI message, after receiving the DCI message. In a seventh additional aspect, alone or in combination with one or more of the first through sixth aspects, the process 700 includes transmitting, to the BS, an acknowledgement feedback message associated with the DCI message, and associating the joint downlink and uplink TCI state with at least one of the communication channel or the reference signal after an amount of time, indicated by an action time associated with the DCI message, after transmitting the acknowledgement feedback message.

In an eighth additional aspect, alone or in combination with one or more of the first through seventh aspects, the process 700 includes receiving, from the BS, a MAC-CE message activating a subset of candidate joint downlink and uplink TCI states from a set of candidate joint downlink and uplink TCI states indicated by an RRC configuration, and the DCI message indicates a candidate joint downlink and uplink TCI state from the subset of candidate joint downlink and uplink TCI states indicated by MAC-CE message.

In a ninth additional aspect, alone or in combination with one or more of the first through eighth aspects, the communication channel includes at least one of a PDCCH, a PDSCH, a PUCCH, a PUSCH, or a PRACH. In a tenth additional aspect, alone or in combination with one or more of the first through ninth aspects, the PDSCH includes at least one of a PDSCH scheduled by downlink control information, or a PDSCH scheduled by SPS. In an eleventh additional aspect, alone or in combination with one or more of the first through tenth aspects, the communication channel includes at least one of a periodic communication channel, a semi-persistent communication channel, or an aperiodic communication channel.

In a twelfth additional aspect, alone or in combination with one or more of the first through eleventh aspects, the reference signal includes at least one of a periodic CSI-RS, a semi-persistent CSI-RS, an aperiodic CSI-RS, a periodic PRS, a semi-persistent PRS, an aperiodic PRS, a periodic SRS, a semi-persistent SRS, or an aperiodic SRS.

In a thirteenth additional aspect, alone or in combination with one or more of the first through twelfth aspects, the process 700 includes receiving, from the BS, an indication of a communication direction associated with the joint downlink and uplink TCI state. In a fourteenth additional aspect, alone or in combination with one or more of the first through thirteenth aspects, the indication of the communication direction associated with the joint downlink and uplink TCI state indicates that the joint downlink and uplink TCI state is associated with communications in a downlink communication direction only, an uplink communication direction only, or a downlink communication direction and an uplink communication direction.

In a fifteenth additional aspect, alone or in combination with one or more of the first through fourteenth aspects, the indication of the communication direction is included in an RRC configured field. In a sixteenth additional aspect, alone or in combination with one or more of the first through fifteenth aspects, the RRC configured field is a field included in the indication of the joint downlink and uplink TCI state. In a seventeenth additional aspect, alone or in combination with one or more of the first through sixteenth aspects, the RRC configured field is an information element field that is separate from the indication of the joint downlink and uplink TCI state.

In an eighteenth additional aspect, alone or in combination with one or more of the first through seventeenth aspects, receiving the indication of the communication direction associated with the joint downlink and uplink TCI state occurs via a MAC-CE message. In a nineteenth additional aspect, alone or in combination with one or more of the first through eighteenth aspects, the MAC-CE message activates one or more joint downlink and uplink TCI states, including the joint downlink and uplink TCI state, and the MAC-CE message includes a field for each joint downlink and uplink TCI state to indicate a communication direction. In a twentieth additional aspect, alone or in combination with one or more of the first through nineteenth aspects, receiving the indication of the communication direction associated with the joint downlink and uplink TCI state includes receiving a first MAC-CE message that activates the joint downlink and uplink TCI state, and receiving a second MAC-CE message that includes the indication of the communication direction associated with the joint downlink and uplink TCI state.

In a twenty-first additional aspect, alone or in combination with one or more of the first through twentieth aspects, receiving the indication of the communication direction associated with the joint downlink and uplink TCI state occurs via a DCI message. In a twenty-second additional aspect, alone or in combination with one or more of the first through twenty-first aspects, the DCI message indicates that one or more joint downlink and uplink TCI states, including the joint downlink and uplink TCI state, are selected from a set of activated joint downlink and uplink TCI states, and the DCI message includes a field for each joint downlink and uplink TCI state to indicate a communication direction. In a twenty-third additional aspect, alone or in combination with one or more of the first through twenty-second aspects, receiving the indication of the communication direction associated with the joint downlink and uplink TCI state includes receiving a first DCI message selecting the joint downlink and uplink TCI state from a set of activated joint downlink and uplink TCI states, and receiving a second DCI message indicating the communication direction associated with the joint downlink and uplink TCI state.

In a twenty-fourth additional aspect, alone or in combination with one or more of the first through twenty-third aspects, the process 700 includes receiving, from the BS, an indication of at least one of one or more transmission types associated with the joint downlink and uplink TCI state, or one or more transmission resources associated with the joint downlink and uplink TCI state.

In a twenty-fifth additional aspect, alone or in combination with one or more of the first through twenty-fourth aspects, the process 700 includes receiving an indication that the joint downlink and uplink TCI state is associated with a downlink communication direction only, or with a downlink communication direction and an uplink communication direction.

In a twenty-sixth additional aspect, alone or in combination with one or more of the first through twenty-fifth aspects, the one or more transmission types associated with the joint downlink and uplink TCI state include at least one of all PDSCH transmission types dedicated to the UE, or a subset of PDSCH transmission types of all PDSCH transmission types dedicated to the UE. In a twenty-seventh additional aspect, alone or in combination with one or more of the first through twenty-sixth aspects, a PDSCH transmission type includes at least one of an SPS PDSCH transmission, a PDSCH transmission scheduled by DCI with a scheduling offset less than a beam switch latency threshold, or a PDSCH transmission scheduled by DCI with a scheduling offset greater than or equal to the beam switch latency threshold.

In a twenty-eighth additional aspect, alone or in combination with one or more of the first through twenty-seventh aspects, the one or more transmission resources associated with the joint downlink and uplink TCI state include at least one of: all CORESETs associated with the UE; a subset of CORESETs, of all CORESETs associated with the UE; all search spaces associated with the UE; a subset of search spaces, of all search spaces associated with the UE; all CSI-RS resources associated with the UE; or a subset of CSI-RS resources, of all CSI-RS resources associated with the UE. In a twenty-ninth additional aspect, alone or in combination with one or more of the first through twenty-eighth aspects, the subset of CORESETs, of all CORESETs associated with the UE, are indicated by indexes associated with the subset of CORESETs. In a thirtieth additional aspect, alone or in combination with one or more of the first through twenty-ninth aspects, the subset of search spaces, of all search spaces associated with the UE, are indicated by indexes or types associated with the subset of search spaces. In a thirty-first additional aspect, alone or in combination with one or more of the first through thirtieth aspects, a type of search space includes a UE specific search space (USS) or a common search space (CSS).

In a thirty-second additional aspect, alone or in combination with one or more of the first through thirty-first aspects, the subset of CSI-RS resources, of all CSI-RS resources associated with the UE, are indicated by resource identifiers or types associated with the subset of CSI-RS resources. In a thirty-third additional aspect, alone or in combination with one or more of the first through thirty-second aspects, a type of CSI-RS resource includes at least one of a periodic CSI-RS resource, a semi-persistent CSI-RS resource, an aperiodic CSI-RS resource, a beam management CSI-RS resource, a tracking reference signal (TRS) CSI-RS resource, or a channel state feedback CSI-RS resource.

In a thirty-fourth additional aspect, alone or in combination with one or more of the first through thirty-third aspects, the process 700 includes receiving an indication that the joint downlink and uplink TCI state is associated with an uplink communication direction only, or with a downlink communication direction and an uplink communication direction.

In a thirty-fifth additional aspect, alone or in combination with one or more of the first through thirty-fourth aspects, the one or more transmission types associated with the joint downlink and uplink TCI state include at least one of PUSCH transmission types dedicated to the UE, a subset of PUSCH transmission types of all PUSCH transmission types dedicated to the UE, all PUCCH transmission types dedicated to the UE, or a subset of PUCCH transmission types of all PUCCH transmission types dedicated to the UE. In a thirty-sixth additional aspect, alone or in combination with one or more of the first through thirty-fifth aspects, a PUSCH transmission type includes at least one of a CG PUSCH transmission, a PUSCH transmission scheduled by DCI, a codebook based PUSCH transmission, or a non-codebook based PUSCH transmission. In a thirty-seventh additional aspect, alone or in combination with one or more of the first through thirty-sixth aspects, a PUCCH transmission type includes at least one of a periodic PUCCH transmission, a semi-persistent PUCCH transmission, or an aperiodic PUCCH transmission.

In a thirty-eighth additional aspect, alone or in combination with one or more of the first through thirty-seventh aspects, the one or more transmission resources associated with the joint downlink and uplink TCI state include at least one of: all SRS resources associated with the UE; a subset of SRS resources, of all SRS resources associated with the UE; all PRACH resources associated with the UE; or a subset of PRACH resources, of all PRACH resources associated with the UE. In a thirty-ninth additional aspect, alone or in combination with one or more of the first through thirty-eighth aspects, the subset of SRS resources, of all SRS resources associated with the UE, are indicated by resource identifiers or types associated with the subset of SRS resources.

In a fortieth additional aspect, alone or in combination with one or more of the first through thirty-ninth aspects, a type of SRS resource includes at least one of a periodic SRS resource, a semi-persistent SRS resource, an aperiodic SRS resource, a codebook based SRS resource, a non-codebook based SRS resource, an SRS resource for antenna switching, or an SRS resource for beam management. In a forty-first additional aspect, alone or in combination with one or more of the first through fortieth aspects, the subset of PRACH resources, of all PRACH resources associated with the UE, are indicated by resource identifiers or types associated with the subset of PRACH resources.

In a forty-second additional aspect, alone or in combination with one or more of the first through forty-first aspects, a type of PRACH resource includes at least one of a contention free random access PRACH resource, a contention based random access PRACH resource, or a PRACH resource that is not associated with a beam failure recovery purpose.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

Figure 8:
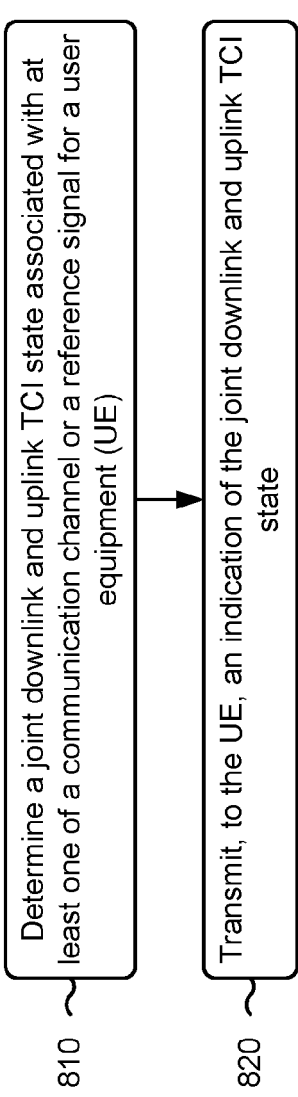
FIG. 8 is a diagram illustrating an example process performed, for example, by a BS.
Figure 8:

FIG. 8 is a diagram illustrating an example process 800 performed, for example, by a BS. The process 800 is an example where the BS (such as the BS 110 depicted in, and described in connection with, FIGS. 1-7) performs operations associated with an update of transmission configurations for joint downlink and uplink TCI states.

As shown in FIG. 8, in some aspects, the process 800 may include determining a joint downlink and uplink TCI state associated with at least one of a communication channel or a reference signal for a UE (such as the UE 120 depicted in, and described in connection with, FIGS. 1-7) (block 810). For example, the BS (such as by using determination component 1008, depicted in FIG. 10) may determine a joint downlink and uplink TCI state associated with at least one of a communication channel or a reference signal for a UE, as described herein. For example, a processing system of the BS can be configured to determine a joint downlink and uplink TCI state associated with at least one of a communication channel or a reference signal for a UE.

As further shown in FIG. 8, in some aspects, the process 800 may include transmitting, to the UE, an indication of the joint downlink and uplink TCI state (block 820). For example, the BS (such as by using transmission component 1004, depicted in FIG. 10) may transmit, to the UE, an indication of the joint downlink and uplink TCI state, as described herein. For example, the transmission component 1004 can be configured to output, to the UE, an indication of the joint downlink and uplink TCI state.

The process 800 may include additional aspects, such as any single aspect or any combination of aspects described herein or in connection with one or more other processes described elsewhere herein.

In a first additional aspect, the process 800 includes communicating, with the UE, using at least one of the communication channel or the reference signal, in accordance with the joint downlink and uplink TCI state.

In a second additional aspect, alone or in combination with the first aspect, transmitting the indication of the joint downlink and uplink TCI state occurs via an RRC message. In a third additional aspect, alone or in combination with one or more of the first and second aspects, transmitting the indication of the joint downlink and uplink TCI state occurs via a MAC-CE message.

In a fourth additional aspect, alone or in combination with one or more of the first through third aspects, the process 800 includes receiving, from the UE, an acknowledgement feedback message associated with the MAC-CE message, associating the joint downlink and uplink TCI state with at least one of the communication channel or the reference signal after an amount of time, indicated by an action time associated with the MAC-CE message, after receiving the acknowledgement feedback message.

In a fifth additional aspect, alone or in combination with one or more of the first through fourth aspects, the process 800 includes transmitting, to the UE, an RRC configuration indicating a set of candidate joint downlink and uplink TCI states, and the MAC-CE message indicates a candidate joint downlink and uplink TCI state from the set of candidate joint downlink and uplink TCI states indicated by the RRC configuration.

In a sixth additional aspect, alone or in combination with one or more of the first through fifth aspects, transmitting the indication of the joint downlink and uplink TCI state to be applied to at least one of the communication channel or the reference signal includes transmitting the indication of the joint downlink and uplink TCI state via a DCI message. In a seventh additional aspect, alone or in combination with one or more of the first through sixth aspects, the process 800 includes associating the joint downlink and uplink TCI state with at least one of the communication channel or the reference signal after an amount of time, indicated by an action time associated with the DCI message, after transmitting the DCI message.

In an eighth additional aspect, alone or in combination with one or more of the first through seventh aspects, the process 800 includes receiving, from the UE, an acknowledgement feedback message associated with the DCI message, and associating the joint downlink and uplink TCI state with at least one of the communication channel or the reference signal after an amount of time, indicated by an action time associated with the DCI message, after receiving the acknowledgement feedback message.

In a ninth additional aspect, alone or in combination with one or more of the first through eighth aspects, the process 800 includes transmitting, to the UE, a MAC-CE message activating a subset of candidate joint downlink and uplink TCI states from a set of candidate joint downlink and uplink TCI states indicated by an RRC configuration, and the DCI message indicates a candidate joint downlink and uplink TCI state from the subset of candidate joint downlink and uplink TCI states indicated by MAC-CE message.

In a tenth additional aspect, alone or in combination with one or more of the first through ninth aspects, the communication channel includes at least one of a PDCCH, a PDSCH, a PUCCH, a PUSCH, or a PRACH. In an eleventh additional aspect, alone or in combination with one or more of the first through tenth aspects, the PDSCH includes at least one of a PDSCH scheduled by DCI, or a PDSCH scheduled by SPS.

In a twelfth additional aspect, alone or in combination with one or more of the first through eleventh aspects, the communication channel includes at least one of a periodic communication channel, a semi-persistent communication channel, or an aperiodic communication channel.

In a thirteenth additional aspect, alone or in combination with one or more of the first through twelfth aspects, the reference signal includes at least one of a periodic CSI-RS, a semi-persistent CSI-RS, an aperiodic CSI-RS, a periodic PRS, a semi-persistent PRS, an aperiodic PRS, a periodic SRS, a semi-persistent SRS, or an aperiodic SRS.

In a fourteenth additional aspect, alone or in combination with one or more of the first through thirteenth aspects, the process 800 includes transmitting, to the UE, an indication of a communication direction associated with the joint downlink and uplink TCI state. In a fifteenth additional aspect, alone or in combination with one or more of the first through fourteenth aspects, the indication of the communication direction associated with the joint downlink and uplink TCI state indicates that the joint downlink and uplink TCI state is associated with communications in a downlink communication direction only, an uplink communication direction only, or a downlink communication direction and an uplink communication direction.

In a sixteenth additional aspect, alone or in combination with one or more of the first through fifteenth aspects, the indication of the communication direction is included in an RRC configured field. In a seventeenth additional aspect, alone or in combination with one or more of the first through sixteenth aspects, the RRC configured field is a field included in the indication of the joint downlink and uplink TCI state. In an eighteenth additional aspect, alone or in combination with one or more of the first through seventeenth aspects, the RRC configured field is an information element field that is separate from the indication of the joint downlink and uplink TCI state.

In a nineteenth additional aspect, alone or in combination with one or more of the first through eighteenth aspects, transmitting the indication of the communication direction associated with the joint downlink and uplink TCI state occurs via a MAC-CE message. In a twentieth additional aspect, alone or in combination with one or more of the first through nineteenth aspects, the MAC-CE message activates one or more joint downlink and uplink TCI states, including the joint downlink and uplink TCI state, and the MAC-CE message includes a field for each joint downlink and uplink TCI state to indicate a communication direction.

In a twenty-first additional aspect, alone or in combination with one or more of the first through twentieth aspects, transmitting the indication of the communication direction associated with the joint downlink and uplink TCI state includes transmitting a first MAC-CE message that activates the joint downlink and uplink TCI state, and transmitting a second MAC-CE message that includes the indication of the communication direction associated with the joint downlink and uplink TCI state.

In a twenty-second additional aspect, alone or in combination with one or more of the first through twenty-first aspects, transmitting the indication of the communication direction associated with the joint downlink and uplink TCI state occurs via a DCI message.

In a twenty-third additional aspect, alone or in combination with one or more of the first through twenty-second aspects, the DCI message indicates that one or more joint downlink and uplink TCI states, including the joint downlink and uplink TCI state, are selected from a set of activated joint downlink and uplink TCI states, and the DCI message includes a field for each joint downlink and uplink TCI state to indicate a communication direction.

In a twenty-fourth additional aspect, alone or in combination with one or more of the first through twenty-third aspects, transmitting the indication of the communication direction associated with the joint downlink and uplink TCI state includes transmitting a first DCI message selecting the joint downlink and uplink TCI state from a set of activated joint downlink and uplink TCI states, and transmitting a second DCI message indicating the communication direction associated with the joint downlink and uplink TCI state.

In a twenty-fifth additional aspect, alone or in combination with one or more of the first through twenty-fourth aspects, the process 800 includes transmitting, to the UE, an indication of at least one of one or more transmission types associated with the joint downlink and uplink TCI state, or one or more transmission resources associated with the joint downlink and uplink TCI state.

In a twenty-sixth additional aspect, alone or in combination with one or more of the first through twenty-fifth aspects, the process 800 includes transmitting an indication that the joint downlink and uplink TCI state is associated with a downlink communication direction only, or with a downlink communication direction and an uplink communication direction.

In a twenty-seventh additional aspect, alone or in combination with one or more of the first through twenty-sixth aspects, the one or more transmission types associated with the joint downlink and uplink TCI state include at least one of all PDSCH transmission types dedicated to the UE, or a subset of PDSCH transmission types of all PDSCH transmission types dedicated to the UE. In a twenty-eighth additional aspect, alone or in combination with one or more of the first through twenty-seventh aspects, a PDSCH transmission type includes at least one of an SPS PDSCH transmission, a PDSCH transmission scheduled by DCI with a scheduling offset less than a beam switch latency threshold, or a PDSCH transmission scheduled by DCI with a scheduling offset greater than or equal to the beam switch latency threshold.

In a twenty-ninth additional aspect, alone or in combination with one or more of the first through twenty-eighth aspects, the one or more transmission resources associated with the joint downlink and uplink TCI state include at least one of all CORESETs associated with the UE, a subset of CORESETs of all CORESETs associated with the UE, all search spaces associated with the UE, a subset of search spaces of all search spaces associated with the UE, all CSI-RS resources associated with the UE, or a subset of CSI-RS resources of all CSI-RS resources associated with the UE. In a thirtieth additional aspect, alone or in combination with one or more of the first through twenty-ninth aspects, the subset of CORESETs, of all CORESETs associated with the UE, are indicated by indexes associated with the subset of CORESETs. In a thirty-first additional aspect, alone or in combination with one or more of the first through thirtieth aspects, the subset of search spaces, of all search spaces associated with the UE, are indicated by indexes or types associated with the subset of search spaces. In a thirty-second additional aspect, alone or in combination with one or more of the first through thirty-first aspects, a type of search space includes a USS or a CSS.

In a thirty-third additional aspect, alone or in combination with one or more of the first through thirty-second aspects, the subset of CSI-RS resources, of all CSI-RS resources associated with the UE, are indicated by resource identifiers or types associated with the subset of CSI-RS resources. In a thirty-fourth additional aspect, alone or in combination with one or more of the first through thirty-third aspects, a type of CSI-RS resource includes at least one of a periodic CSI-RS resource, a semi-persistent CSI-RS resource, an aperiodic CSI-RS resource, a beam management CSI-RS resource, a tracking reference signal CSI-RS resource, or a channel state feedback CSI-RS resource.

In a thirty-fifth additional aspect, alone or in combination with one or more of the first through thirty-fourth aspects, the process 800 includes transmitting an indication that the joint downlink and uplink TCI state is associated with an uplink communication direction only, or with a downlink communication direction and an uplink communication direction.

In a thirty-sixth additional aspect, alone or in combination with one or more of the first through thirty-fifth aspects, the one or more transmission types associated with the joint downlink and uplink TCI state include at least one of: all PUSCH transmission types dedicated to the UE, a subset of PUSCH transmission types of all PUSCH transmission types dedicated to the UE, all PUCCH transmission types dedicated to the UE, or a subset of PUCCH transmission types of all PUCCH transmission types dedicated to the UE. In a thirty-seventh additional aspect, alone or in combination with one or more of the first through thirty-sixth aspects, a PUSCH transmission type includes at least one of a CG PUSCH transmission, a PUSCH transmission scheduled by DCI, a codebook based PUSCH transmission, or a non-codebook based PUSCH transmission. In a thirty-eighth additional aspect, alone or in combination with one or more of the first through thirty-seventh aspects, a PUCCH transmission type includes at least one of a periodic PUCCH transmission, a semi-persistent PUCCH transmission, or an aperiodic PUCCH transmission.

In a thirty-ninth additional aspect, alone or in combination with one or more of the first through thirty-eighth aspects, the one or more transmission resources associated with the joint downlink and uplink TCI state include at least one of: all SRS resources associated with the UE, a subset of SRS resources of all SRS resources associated with the UE, all PRACH resources associated with the UE, or a subset of PRACH resources of all PRACH resources associated with the UE. In a fortieth additional aspect, alone or in combination with one or more of the first through thirty-ninth aspects, the subset of SRS resources, of all SRS resources associated with the UE, are indicated by resource identifiers or types associated with the subset of SRS resources. In a forty-first additional aspect, alone or in combination with one or more of the first through fortieth aspects, a type of SRS resource includes at least one of: a periodic SRS resource, a semi-persistent SRS resource, an aperiodic SRS resource, a codebook based SRS resource, a non-codebook based SRS resource, an SRS resource for antenna switching, or an SRS resource for beam management. In a forty-second additional aspect, alone or in combination with one or more of the first through forty-first aspects, the subset of PRACH resources, of all PRACH resources associated with the UE, are indicated by resource identifiers or types associated with the subset of PRACH resources. In a forty-third additional aspect, alone or in combination with one or more of the first through forty-second aspects, a type of PRACH resource includes at least one of a contention free random access PRACH resource, a contention based random access PRACH resource, or a PRACH resource that is not associated with a beam failure recovery purpose.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

Figure 9:
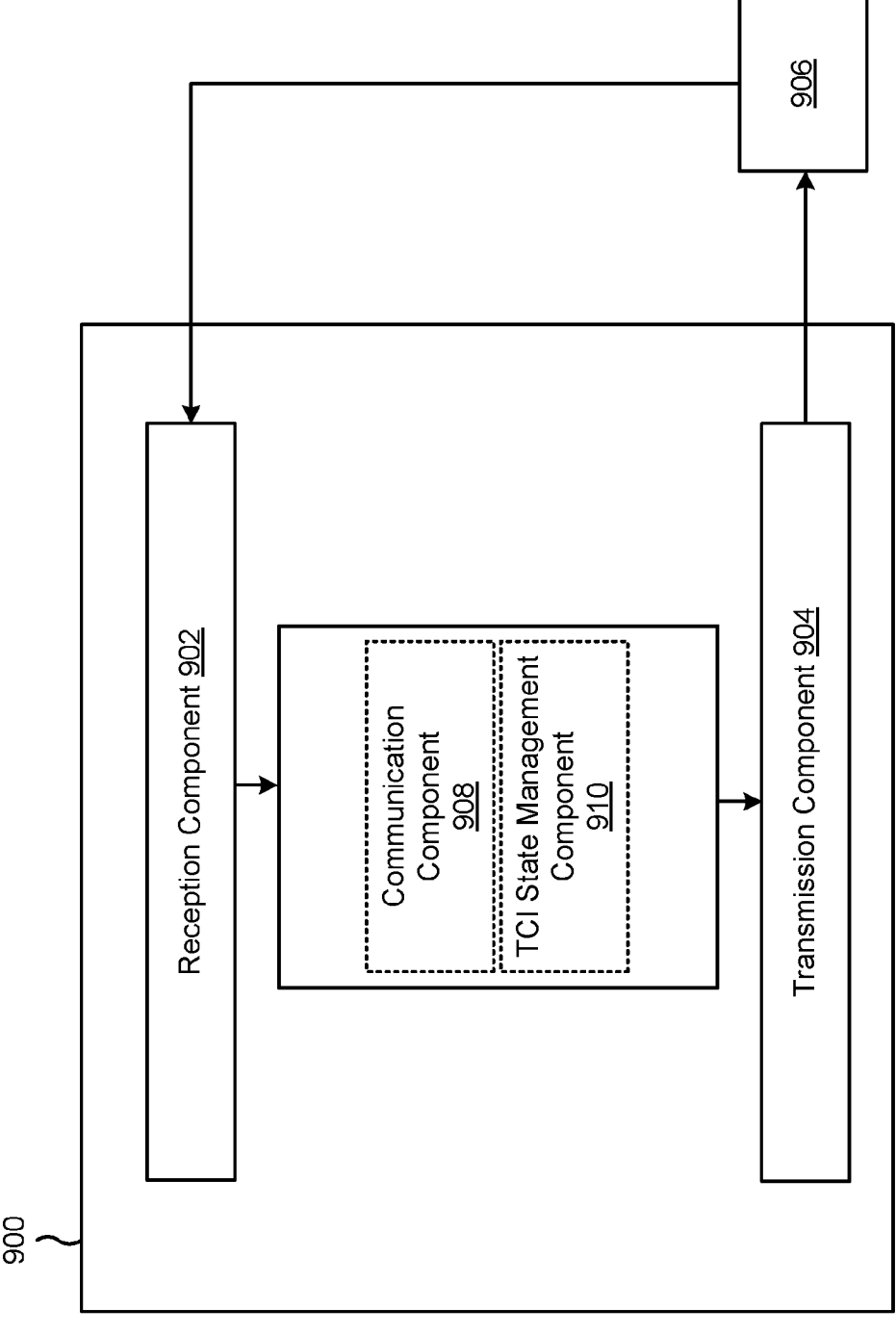
FIGS. 9-10 are block diagrams of example apparatuses for wireless communication Like reference numbers and designations in the various drawings indicate like elements.

FIG. 9 is a block diagram of an example apparatus 900 for wireless communication. The apparatus 900 may be a UE (such as the UE 120 depicted in, and described in connection with, FIGS. 1-8), or a UE may include the apparatus 900. In some aspects, the apparatus 900 includes a reception component 902 and a transmission component 904, which may be in communication with one another (for example, via one or more buses or one or more other components). As shown, the apparatus 900 may communicate with another apparatus 906 (such as a UE, a BS, or another wireless communication device) using the reception component 902 and the transmission component 904. As further shown, the apparatus 900 may include one or more of a communication component 908, a TCI state management component 910, among other examples.

In some aspects, the apparatus 900 may be configured to perform one or more operations described herein in connection with FIG. 6. Additionally or alternatively, the apparatus

900 may be configured to perform one or more processes described herein, such as process 700 of FIG. 7, or a combination thereof. In some aspects, the apparatus 900 or one or more components shown in FIG. 9 may include one or more components of the UE described herein in connection with FIG. 2. Additionally, or alternatively, one or more components shown in FIG. 9 may be implemented within one or more components described herein in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described herein in connection with FIG. 2. In some aspects, the reception component 902 may include an interface with a processing system of the apparatus 900 (for example, the first interface of the UE 120 described herein in connection with FIG. 2). The reception component 902 may be configured to obtain or receive information via the interface.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described herein in connection with FIG. 2. In some aspects, the transmission component 904 may be co-located with the reception component 902 in a transceiver. In some aspects, the transmission component 904 may include an interface with a processing system of the apparatus 900 (for example, the second interface of the UE 120 described herein in connection with FIG. 2). The transmission component 904 may be configured to output or transmit information via the interface.

The reception component 902 may receive, from a BS, an indication of a joint downlink and uplink TCI state associated with at least one of a communication channel or a reference signal. The communication component 908 may communicate, with the BS, using at least one of the communication channel or the reference signal, in accordance with the joint downlink and uplink TCI state. In some aspects, the communication component 908 may include one or more antennas, a demodulator, a MIMO detector, a receive processor, a modulator, a transmit MIMO processor, a transmit processor, a controller/processor, a memory, or a combination thereof, of the UE described herein in connection with FIG. 2. In some aspects, the communication component 908 may cause the reception component 902 to receive a communication, from the BS, using at least one of the communication channel or the reference signal, in accordance with the joint downlink and uplink TCI state. In some aspects, the communication component 908 may cause the transmission component 904 to transmit a communication, to the BS, using at least one of the communication channel or the reference signal, in accordance with the joint downlink and uplink TCI state.

The transmission component 904 may transmit, to the BS, an acknowledgement feedback message associated with the MAC-CE message. The TCI state management component 910 may associate the joint downlink and uplink TCI state with at least one of the communication channel or the reference signal after an amount of time, indicated by an action time associated with the MAC-CE message, after transmitting the acknowledgement feedback message. In some aspects, the TCI state management component 910 may include a receive processor, a transmit MIMO processor, a transmit processor, a controller/processor, a memory, or a combination thereof, of the UE described herein in connection with FIG. 2.

The reception component 902 may receive, from the BS, an RRC configuration indicating a set of candidate joint downlink and uplink TCI states. The TCI state management component 910 may associate the joint downlink and uplink TCI state with at least one of the communication channel or the reference signal after an amount of time, indicated by an action time associated with the DCI message, after receiving the DCI message. The transmission component 904 may transmit, to the BS, an acknowledgement feedback message associated with the DCI message. The TCI state management component 910 may associate the joint downlink and uplink TCI state with at least one of the communication channel or the reference signal after an amount of time, indicated by an action time associated with the DCI message, after transmitting the acknowledgement feedback message.

The reception component 902 may receive, from the BS, a MAC-CE message activating a subset of candidate joint downlink and uplink TCI states from a set of candidate joint downlink and uplink TCI states indicated by an RRC configuration. The reception component 902 may receive, from the BS, an indication of a communication direction associated with the joint downlink and uplink TCI state. The reception component 902 may receive, from the BS, an indication of at least one of one or more transmission types associated with the joint downlink and uplink TCI state, or one or more transmission resources associated with the joint downlink and uplink TCI state.

The reception component 902 may receive an indication that the joint downlink and uplink TCI state is associated with a downlink communication direction only, or with a downlink communication direction and an uplink communication direction. The reception component 902 may receive an indication that the joint downlink and uplink TCI state is associated with an uplink communication direction only, or with a downlink communication direction and an uplink communication direction.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
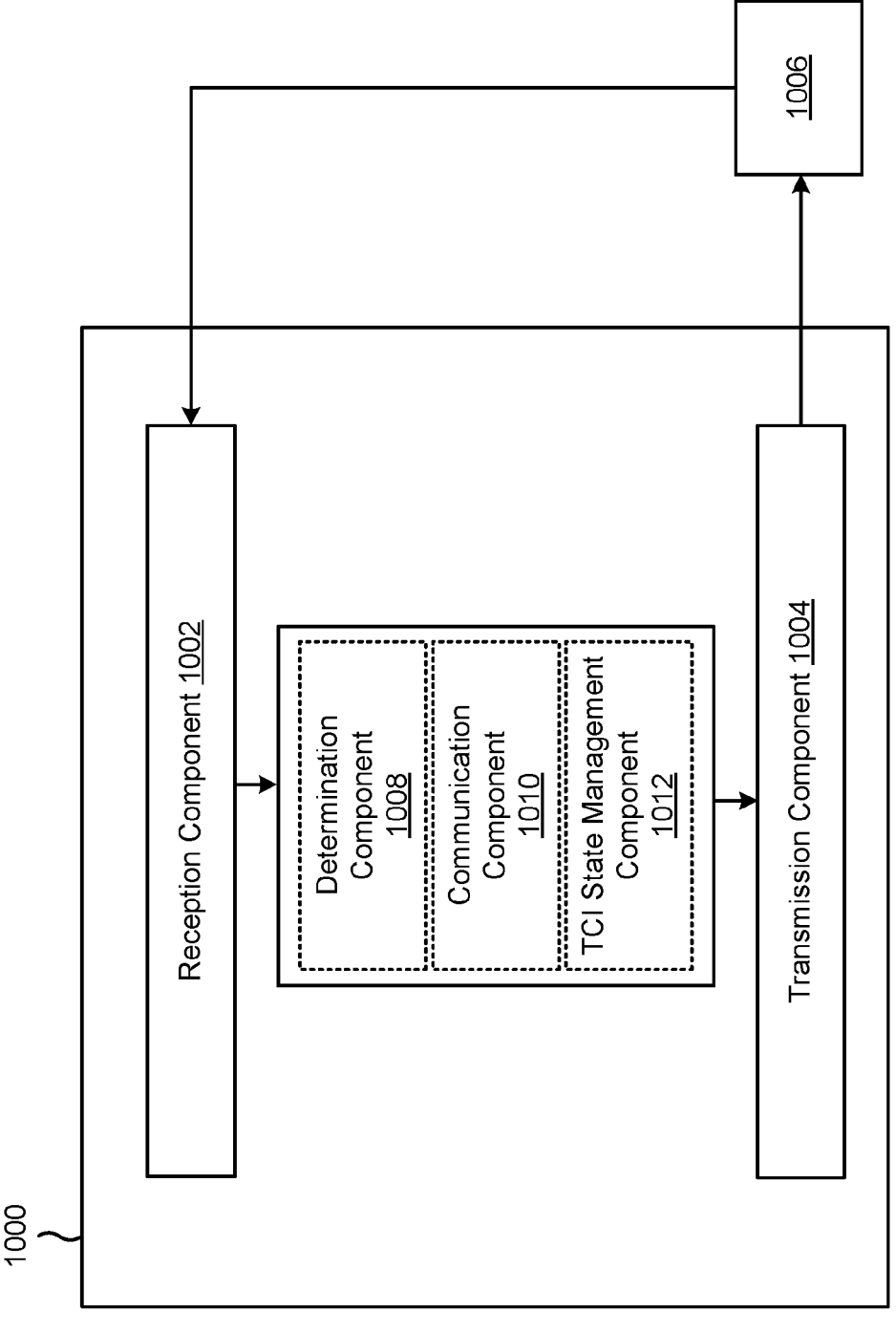

FIG. 10 is a block diagram of an example apparatus 1000 for wireless communication. The apparatus 1000 may be a BS (such as the BS 110 depicted in, and described in connection with, FIGS. 1-9), or a BS may include the apparatus 1000. In some aspects, the apparatus 1000 includes a reception component 1002 and a transmission component 1004, which may be in communication with one another (for example, via one or more buses or one or more other components). As shown, the apparatus 1000 may communicate with another apparatus 1006 (such as a UE, a BS, or another wireless communication device) using the reception component 1002 and the transmission component 1004. As further shown, the apparatus 1000 may include one or more of a determination component 1008, a communication component 1010, or a TCI state management component 1012, among other examples.

In some aspects, the apparatus 1000 may be configured to perform one or more operations described herein in connection with FIG. 6. Additionally or alternatively, the apparatus 1000 may be configured to perform one or more processes described herein, such as process 800 of FIG. 8, or a combination thereof. In some aspects, the apparatus 1000 or one or more components shown in FIG. 10 may include one or more components of the BS described herein in connection with FIG. 2. Additionally, or alternatively, one or more components shown in FIG. 10 may be implemented within one or more components described herein in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the BS described herein in connection with FIG. 2. In some aspects, the reception component 1002 may include an interface with a processing system of the apparatus 1000 (for example, the first interface of the BS 110 described herein in connection with FIG. 2). The reception component 1002 may be configured to obtain or receive information via the interface.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the BS described herein in connection with FIG. 2. In some aspects, the transmission component 1004 may be co-located with the reception component 1002 in a transceiver. In some aspects, the transmission component 1004 may include an interface with a processing system of the apparatus 1000 (for example, the second interface of the BS 110 described herein in connection with FIG. 2). The transmission component 1004 may be configured to output or transmit information via the interface.

The determination component 1008 may determine a joint downlink and uplink TCI state associated with at least one of a communication channel or a reference signal for a UE (such as the UE 120 depicted in, and described in connection with, FIGS. 1-9). In some aspects, the determination component 1008 may include a receive processor, a transmit MIMO processor, a transmit processor, a controller/processor, a memory, or a combination thereof, of the BS described herein in connection with FIG. 2. The transmission component 1004 may transmit, to the UE, an indication of the joint downlink and uplink TCI state.

The communication component 1010 may communicate, with the UE, using at least one of the communication channel or the reference signal, in accordance with the joint downlink and uplink TCI state. In some aspects, the communication component 1010 may include one or more antennas, a demodulator, a MIMO detector, a receive processor, a modulator, a transmit MIMO processor, a transmit processor, a controller/processor, a memory, or a combination thereof, of the BS described herein in connection with FIG. 2. In some aspects, the communication component 1010 may cause the reception component 1002 to receive a communication, from the UE, using at least one of the communication channel or the reference signal, in accordance with the joint downlink and uplink TCI state. In some aspects, the communication component 1010 may cause the transmission component 1004 to transmit a communication, to the UE, using at least one of the communication channel or the reference signal, in accordance with the joint downlink and uplink TCI state.

The reception component 1002 may receive, from the UE, an acknowledgement feedback message associated with the MAC-CE message. The TCI state management component 1012 may associate the joint downlink and uplink TCI state with at least one of the communication channel or the reference signal after an amount of time, indicated by an action time associated with the MAC-CE message, after receiving the acknowledgement feedback message. In some aspects, the TCI state management component 1012 may include a receive processor, a transmit MIMO processor, a transmit processor, a controller/processor, a memory, or a combination thereof, of the BS described herein in connection with FIG. 2.

The transmission component 1004 may transmit, to the UE, an RRC configuration indicating a set of candidate joint downlink and uplink TCI states. The transmission component 1004 may transmit, to the UE, a DCI message indicating the joint downlink and uplink TCI state. The TCI state management component 1012 may associate the joint downlink and uplink TCI state with at least one of the communication channel or the reference signal after an amount of time, indicated by an action time associated with the DCI message, after transmitting the DCI message.

The reception component 1002 may receive, from the UE, an acknowledgement feedback message associated with the DCI message. The TCI state management component 1012 may associate the joint downlink and uplink TCI state with at least one of the communication channel or the reference signal after an amount of time, indicated by an action time associated with the DCI message, after receiving the acknowledgement feedback message. The transmission component 1004 may transmit, to the UE, a MAC-CE message activating a subset of candidate joint downlink and uplink TCI states from a set of candidate joint downlink and uplink TCI states indicated by an RRC configuration.

The transmission component 1004 may transmit, to the UE, an indication of a communication direction associated with the joint downlink and uplink TCI state. The transmission component 1004 may transmit, to the UE, an indication of at least one of one or more transmission types associated with the joint downlink and uplink TCI state, or one or more transmission resources associated with the joint downlink and uplink TCI state. The transmission component 1004 may transmit an indication that the joint downlink and uplink TCI state is associated with a downlink communication direction only, or with a downlink communication direction and an uplink communication direction. The transmission component 1004 may transmit an indication that the joint downlink and uplink TCI state is associated with an uplink communication direction only, or with a downlink communication direction and an uplink communication direction.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, satisfying a threshold may refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a-b, a-c, b-c, and a-b-c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described herein should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:

receiving, from a network node via a radio resource control (RRC) message, an indication of a joint downlink and uplink transmission configuration indicator (TCI) state associated with fat least one of a communication channel or a reference signal;

receiving, from the network node and in an RRC configured field, an indication of a communication direction for the joint downlink and uplink TCI state, wherein the indication of the communication direction selectively indicates one of a downlink communication direction only, an uplink communication direction only, or a downlink communication direction and an uplink communication direction; and communicating, with the network node, using at least one of the communication channel or the reference signal, in accordance with the indication of the joint downlink and uplink TCI state and the indication of the communication direction.

2. The method of claim 1, wherein the communication channel includes at least one of:

a physical downlink control channel (PDCCH),
a physical downlink shared channel (PDSCH),
a physical uplink control channel (PUCCH), or
a physical uplink shared channel (PUSCH).

3. The method of claim 2, wherein the PDSCH includes at least one of:

a PDSCH scheduled by downlink control information (DCI), or
a PDSCH scheduled by semi-persistent scheduling (SPS).

4. The method of claim 1, wherein the communication channel includes at least one of:

a periodic communication channel,
a semi-persistent communication channel, or
an aperiodic communication channel.

5. The method of claim 1, wherein the reference signal includes at least one of:

a periodic sounding reference signal (SRS),
a semi-persistent SRS, or
an aperiodic SRS.

6. The method of claim 1, wherein the RRC configured field is an information element field that is separate from the indication of the joint downlink and uplink TCI state.

7. The method of claim 1, further comprising:

receiving, from the network node, an indication of at least one of:

one or more transmission types associated with the joint downlink and uplink TCI state, or
one or more transmission resources associated with the joint downlink and uplink TCI state.

8. The method of claim 7, wherein:

the indication of the communication direction for the joint downlink and uplink TCI state is associated with a downlink communication direction only, or with a downlink communication direction and an uplink communication direction.

9. The method of claim 8, wherein the one or more transmission resources associated with the joint downlink and uplink TCI state include at least one of:

all control resource sets (CORESETs) associated with the UE,
a subset of CORESETs, of all CORESETs associated with the UE,
all search spaces associated with the UE,
a subset of search spaces, of all search spaces associated with the UE,
all channel state information reference signal (CSI-RS) resources associated with the UE, or
a subset of CSI-RS resources of all CSI-RS resources associated with the UE.

10. The method of claim 9, wherein the subset of CORESETs, of all CORESETs associated with the UE, are indicated by indexes associated with the subset of CORESETs.

11. The method of claim 9, wherein the subset of search spaces, of all search spaces associated with the UE, are indicated by indexes or types associated with the subset of search spaces.

12. The method of claim 9, wherein a type of search space, of the search spaces associated with the UE, includes a UE specific search space (USS) or a common search space (CSS).

13. The method of claim 9, wherein the subset of CSI-RS resources, of all CSI-RS resources associated with the UE, are indicated by resource identifiers or types associated with the subset of CSI-RS resources.

14. The method of claim 13, wherein a type of CSI-RS resource includes at least one of:

an aperiodic CSI-RS resource,
a beam management CSI-RS resource, or
a tracking reference signal (TRS) CSI-RS resource.

15. The method of claim 7, wherein:

the indication of the communication direction for the joint downlink and uplink TCI state is associated with an uplink communication direction only, or with a downlink communication direction and an uplink communication direction.

16. The method of claim 15, wherein the one or more transmission resources associated with the joint downlink and uplink TCI state include at least one of:

all sounding reference signal (SRS) resources associated with the UE, or
a subset of SRS resources, of all SRS resources associated with the UE.

17. The method of claim 16, wherein the subset of SRS resources, of all SRS resources associated with the UE, are indicated by resource identifiers or types associated with the subset of SRS resources.

18. The method of claim 17, wherein a type of SRS resource includes at least one of:

a periodic SRS resource,
a semi-persistent SRS resource,
an aperiodic SRS resource,
a codebook based SRS resource,
a non-codebook based SRS resource,
an SRS resource for antenna switching, or
an SRS resource for beam management.

19. The method of claim 1, wherein the indication of the communication direction for the joint downlink and uplink TCI state comprises an indication of a usage associated with the joint downlink and uplink TCI state.

20. A user equipment (UE) for wireless communication, comprising:

a first interface configured to obtain, from a network node via a radio resource control (RRC) message, an indication of a joint downlink and uplink transmission configuration indicator (TCI) state associated with at least one of a communication channel or a reference signal;

the first interface configured to obtain, from the network node and in an RRC configured field, an indication of a communication direction for the joint downlink and uplink TCI state, wherein the indication of the communication direction selectively indicates one of a downlink communication direction only, an uplink communication direction only, or a downlink communication direction and an uplink communication direction; and the first interface or a second interface configured to communicate, with the network node, using at least one of the communication channel or the reference signal, in accordance with the joint downlink and uplink TCI state.

21. The UE of claim 20, wherein the RRC configured field is an information element field that is separate from the indication of the joint downlink and uplink TCI state.

22. The UE of claim 20, wherein the communication channel includes at least one of:

a physical downlink control channel (PDCCH),
a physical downlink shared channel (PDSCH),
a physical uplink control channel (PUCCH), or
a physical uplink shared channel (PUSCH).

23. The UE of claim 20, wherein the communication channel includes at least one of:

a periodic communication channel,
a semi-persistent communication channel, or
an aperiodic communication channel.

24. The UE of claim 20, wherein the reference signal includes at least one of:

a periodic sounding reference signal (SRS),
a semi-persistent SRS, or
an aperiodic SRS.

25. The UE of claim 20, wherein the RRC configured field is an information element field that is separate from the indication of the joint downlink and uplink TCI state.

26. The UE of claim 20, wherein the first interface is further configured to:

receive, from the network node, an indication of at least one of:

one or more transmission types associated with the joint downlink and uplink TCI state, or
one or more transmission resources associated with the joint downlink and uplink TCI state.

27. The UE of claim 26, wherein the indication of the communication direction for the joint downlink and uplink TCI state is associated with an uplink communication direction only, or with a downlink communication direction and an uplink communication direction receiving an indication that the joint downlink and uplink TCI state is associated with an uplink communication direction only, or with a downlink communication direction and an uplink communication direction.

28. The UE of claim 27, wherein the one or more transmission resources associated with the joint downlink and uplink TCI state include at least one of:

all sounding reference signal (SRS) resources associated with the UE, or
a subset of SRS resources, of all SRS resources associated with the UE.

29. The UE of claim 26, wherein the indication of the communication direction for the joint downlink and uplink TCI state is associated with a downlink communication direction only, or with a downlink communication direction and an uplink communication direction.

30. The UE of claim 29, wherein the one or more transmission resources associated with the joint downlink and uplink TCI state include at least one of:

all control resource sets (CORESETs) associated with the UE,
a subset of CORESETs, of all CORESETs associated with the UE,
all search spaces associated with the UE,
a subset of search spaces, of all search spaces associated with the UE,
all channel state information reference signal (CSI-RS) resources associated with the UE, or
a subset of CSI-RS resources of all CSI-RS resources associated with the UE.

* * * * *